(12) United States Patent
Luke et al.

(10) Patent No.: US 11,538,097 B2
(45) Date of Patent: Dec. 27, 2022

(54) APPARATUS, METHOD AND ARTICLE FOR ELECTRIC VEHICLE SHARING

(71) Applicant: Gogoro Inc., Hong Kong (CN)

(72) Inventors: Hok-Sum Horace Luke, Mercer Island, WA (US); Matthew Whiting Taylor, North Bend, WA (US); Kenneth Edward Wall, Greer, SC (US)

(73) Assignee: Gogoro Inc., Hong Kong (CN)

( * ) Notice: Subject to any disclaimer, the term of this patent is extended or adjusted under 35 U.S.C. 154(b) by 436 days.

(21) Appl. No.: 15/228,907

(22) Filed: Aug. 4, 2016

(65) Prior Publication Data

US 2017/0039631 A1 Feb. 9, 2017

Related U.S. Application Data

(60) Provisional application No. 62/201,072, filed on Aug. 4, 2015.

(51) Int. Cl.
*G06Q 30/06* (2012.01)
*G06Q 50/00* (2012.01)
(Continued)

(52) U.S. Cl.
CPC .......... *G06Q 30/0645* (2013.01); *B60L 53/80* (2019.02); *G06Q 20/102* (2013.01); *G06Q 50/00* (2013.01)

(58) Field of Classification Search
CPC .. G06Q 30/0645; G06Q 50/00; G06Q 20/102; B60L 53/80; Y02T 10/7072; Y02T 10/70
(Continued)

(56) References Cited

U.S. PATENT DOCUMENTS

| 6,157,315 A * | 12/2000 | Kokubo | G07B 15/00 340/432 |
| 2001/0037298 A1* | 11/2001 | Ehrman | G06Q 30/0645 705/40 |

(Continued)

FOREIGN PATENT DOCUMENTS

| CN | 101952137 | 1/2011 |
| JP | 2001067581 | 3/2001 |

(Continued)

OTHER PUBLICATIONS

Cole, Jay; Smart Electric Drive Launches May 15th—Lease, Battery Rental and Option Details; May 10, 2013. (Year: 2013).*

(Continued)

*Primary Examiner* — Resha Desai
*Assistant Examiner* — Dione N. Simpson
(74) *Attorney, Agent, or Firm* — Perkins Coie LLP

(57) ABSTRACT

A network of collection and distribution machines may collect, charge and/or distribute portable electrical energy storage devices (e.g., batteries, supercapacitors or ultracapacitors). Electric vehicles available for sharing, renting or otherwise available for temporary use may be located at such collection and distribution machines or other designated areas. Users may request temporary use of such electric vehicles via a user interface of the collection and distribution machine, the user's mobile device or that of the electric vehicle itself. During temporary use, the user may exchange depleted portable electrical energy storage devices of the vehicle being used for charged portable electrical energy storage devices at the collection and distribution machines and may be offered the opportunity to terminate the temporary use session or continue the temporary use session in conjunction with the portable electrical energy storage device exchange.

9 Claims, 11 Drawing Sheets

(51) Int. Cl.
  *B60L 53/80* (2019.01)
  *G06Q 20/10* (2012.01)
(58) Field of Classification Search
  USPC .......................................................... 705/40
  See application file for complete search history.

(56) References Cited

U.S. PATENT DOCUMENTS

| | | | |
|---|---|---|---|
| 2011/0060480 | A1 | 3/2011 | Mottla et al. |
| 2011/0071932 | A1 | 3/2011 | Agassi et al. |
| 2011/0307375 | A1* | 12/2011 | Maney .................... B60R 25/00 701/2 |
| 2012/0232964 | A1 | 9/2012 | Brands |
| 2012/0248868 | A1 | 10/2012 | Mobin et al. |
| 2012/0306618 | A1 | 12/2012 | Tieman et al. |
| 2012/0316671 | A1 | 12/2012 | Hammerslag et al. |
| 2013/0026971 | A1 | 1/2013 | Luke et al. |
| 2013/0026972 | A1 | 1/2013 | Luke et al. |
| 2013/0026973 | A1 | 1/2013 | Luke et al. |
| 2013/0030630 | A1 | 1/2013 | Luke et al. |
| 2013/0311003 | A1 | 11/2013 | El-Fotouh |
| 2013/0317693 | A1* | 11/2013 | Jefferies ................. G07B 15/00 701/31.5 |
| 2013/0321178 | A1* | 12/2013 | Jameel .................. H04W 4/029 340/989 |
| 2015/0126176 | A1 | 5/2015 | Hernández et al. |
| 2015/0127479 | A1* | 5/2015 | Penilla ............... G01C 21/3407 705/305 |
| 2015/0149221 | A1* | 5/2015 | Tremblay ............... G06Q 10/02 320/109 |
| 2015/0248639 | A1* | 9/2015 | Maney ............. G06Q 10/08345 705/335 |
| 2016/0039299 | A1* | 2/2016 | Nguyen .................. B60L 53/80 320/109 |
| 2016/0311334 | A1* | 10/2016 | Moravick ........... B60L 11/1825 |

FOREIGN PATENT DOCUMENTS

| | | | |
|---|---|---|---|
| JP | 2002074578 | | 3/2002 |
| JP | 2010128639 | | 6/2010 |
| JP | 2011039712 | | 2/2011 |
| JP | 2011159072 | | 8/2011 |
| JP | 2011197728 | | 10/2011 |
| JP | 2012211903 | | 11/2012 |
| JP | 2013191004 | | 9/2013 |
| JP | 2014190864 | | 10/2014 |
| JP | 2014529982 | | 11/2014 |
| JP | 2015104157 | | 6/2015 |
| TW | 201512029 | | 4/2015 |
| WO | WO-2009090459 | A1 * | 7/2009 .......... B60W 50/085 |
| WO | 2010033517 | A2 | 3/2010 |
| WO | WO-2012119289 | A1 * | 9/2012 .......... G06Q 30/0645 |

OTHER PUBLICATIONS

"Car Sharing from Zipcar: How Does Car Sharing Work?," Zipcar, Inc., retrieved from http://www.zipcar.com/how/ on Aug. 11, 2016, 7 pages.
"Car Sharing: An Alternative to Car Rental with Zipcar," Zipcar, Inc., retrieved from http://www.zipcar.com/ on Aug. 11, 2016, 8 pages.
"FAQ | Pronto Cycle Share," Motivate International Inc., retrieved from https://www.prontocycleshare.com/faq#BikeShare, on Aug. 11, 2016, 3 pages.
"How It Works | Pronto Cycle Share," Motivate International Inc., retrieved from https://www.prontocycleshare.com/ how-it-works/ on Aug. 11, 2016, 6 pages.
"More Than Sharing," Motit Barcelona SL, retrieved from http://www.motitworld.com/paris/ on Aug. 11, 2016, 3 pages.
"Scoot FAQs," Scoot Networks, Inc., retrieved from https://scoot.co/faq/ on Aug. 11, 2016, 3 pages.
"Scoot Networks," Scoot Networks, Inc., retrieved from https://scoot.co/ on Aug. 11, 2016, 2 pages.
"What is Scoot?—Scoot Networks," Scoot Networks, Inc., retrieved from https://scoot.co/what-is-scoot/ on Aug. 11, 2016, 2 pages.
"Your bike sharing system in Seattle," Motivate International Inc., retrieved from https://www.prontocycleshare.com/ on Aug. 11, 2016, 1 page.
Chen et al., "Apparatus, System and Method for Vending, Charging, and Two-Way Distribution of Electrical Energy Storage Devices," U.S. Appl. No. 62/045,982, filed Sep. 4, 2014, 93 pages.
Luke et al., "Systems and Methods for Asset Tracking Using an Ad-Hoc Mesh Network of Mobile Devices," U.S. Appl. No. 62/090,240, filed Dec. 10, 2014, 49 pages.
Taylor et al., "Apparatus, Method and Article for Providing Vehicle Event Data," U.S. Appl. No. 14/536,042, filed Nov. 7, 2014, 60 pages.
International Search Report and Written Opinion dated Sep. 29, 2016, for corresponding International Application No. PCT/US2016/045625, 10 pages.
European Communication issued for co-pending EP Application No. 16751772.1, Applicant: Gogoro Inc., dated May 20, 2021, 14 pages.

* cited by examiner

APPARATUS, METHOD AND ARTICLE FOR ELECTRIC VEHICLE SHARING

BACKGROUND

Technical Field

The present disclosure generally relates to electric vehicles and more particularly to sharing of electric vehicles that use portable electrical power storage devices.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also, for example, electrical power may be generated at generation plants that produce no air pollution (e.g., nuclear plants). Also, for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example, in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example, by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, limited locations to recharge secondary batteries, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ portable electrical power storage device collection, charging and distribution machines, which may otherwise be termed as collection, charging and distribution machines, kiosks or vending machines, to collect, charge and distribute electrical power storage devices (e.g., batteries, supercapacitors or ultracapacitors) for electric vehicles being shared. Such machines may be distributed about a city or other region at a variety of locations, such as convenience stores or existing gas or petrol filling stations. Also, the terms "collection machine," "distribution machine" or "collection and distribution machine" as used herein include machines which may also include charging and other functionality.

The collection, charging and distribution machines may maintain a stock of fully charged or almost fully charged electrical storage devices for use by end users. The collection, charging and distribution machines may collect, receive or otherwise accept depleted electrical storage devices, for example, as returned by end users, recharging such for reuse by subsequent end users of the shared electric vehicles.

Thus, as a battery or other electrical power storage device reaches or approaches the end of its stored charge, an end user may simply replace, exchange or otherwise swap batteries or other electrical power storage devices at the collection, charging and distribution machines for the vehicle the user is currently sharing, renting or otherwise temporarily using. The user may also request a different vehicle for temporary use instead of swapping a depleted battery for a charged battery for use in the same vehicle. This may address issues related to cost, as well as limited range and locations to recharge electrical power storage devices, and relatively long recharging times.

For these reasons, the ability to have electric vehicles and electrical power storage devices available and the management of the availability of such vehicles and devices and systems for making such vehicles and devices available, is important to commercial success of any such endeavor. Thus, a number of approaches are described herein that provide electric vehicle sharing in a rechargeable electrical power storage device distribution environment.

A method in a system for electric vehicle sharing may be summarized as including: making a determination, by one or more computer processors of a portable electrical power storage device collection, charging and distribution machine, whether to release a portable electrical power storage device from the portable electrical power storage device collection, charging and distribution machine for use in an electric vehicle located in proximity to the portable electrical power storage device collection, charging and distribution machine for temporary use of the electric vehicle; sending, by one or more computer processors of the portable electrical power storage device collection, charging and distribution machine, a signal, in response to the determination, to release a portable electrical power storage device from the portable electrical power storage device collection, charging and distribution machine for use in the electric vehicle located in proximity to the portable electrical power storage device collection, charging and distribution machine; sending, by one or more computer processors of the portable electrical power storage device collection, charging and distribution machine, a signal, in response to the determination, to unlock a portable electrical power storage device compartment in the electric vehicle located in proximity to the portable electrical power storage device collection, charging and distribution machine; and in response to the sending the signal to unlock the portable electrical power storage device compartment, recording, by one or more computer processors of the portable electrical power storage device collection, charging and distribution machine, data indicative that the electric vehicle located in proximity to the portable electrical power storage device collection, charging and distribution machine has been released for temporary use by a user.

The method in a system for electric vehicle sharing may further include: receiving, by one or more computer processors of a portable electrical power storage device collection, charging and distribution machine at which the portable electrical power storage device is being returned to, an indication whether the user is requesting continued temporary use of the electric vehicle; and in response to the received indication whether the user is requesting continued temporary use of the electric vehicle, making a determination, by one or more computer processors of a portable electrical power storage device collection, charging and distribution machine at which the portable electrical power storage device is being returned to, whether to release a portable electrical power storage device located inside the portable electrical power storage device collection, charging and distribution machine at which the portable electrical power storage device is being returned to in exchange for the return of the portable electrical power storage device.

The making the determination whether to release the charged portable electrical power storage device may include making a determination whether the user is authorized continued temporary use of the electric vehicle. The determination whether the user is authorized continued temporary use of the electric vehicle may be based on a payment by the user for continued temporary use of the electric vehicle. The determination whether the user is authorized continued temporary use of the electric vehicle may be based on a current account status of the user that allows for continued temporary use of the electric vehicle.

The method in a system for electric vehicle sharing may further include: prompting the user, by one or more computer processors of the portable electrical power storage device collection, charging and distribution machine at which the portable electrical power storage device is being returned to, to indicate whether the user desires continued temporary use of the electric vehicle; and receiving, by one or more computer processors of the portable electrical power storage device collection, charging and distribution machine at which the portable electrical power storage device is being returned to, the indication whether the user is requesting continued temporary use of the electric vehicle in response to the prompting the user to indicate whether the user desires continued temporary use of the electric vehicle.

The prompting may include, in response to an indication that the user is returning the portable electrical power storage device to a portable electrical power storage device collection, charging and distribution machine in the electric vehicle sharing system, causing, by one or more computer processors of the portable electrical power storage device collection, charging and distribution machine at which the portable electrical power storage device is being returned to, a prompt to appear on a mobile device of the user prompting the user to indicate whether the user desires continued temporary use of the electric vehicle. The indication whether the user is requesting continued temporary use of the electric vehicle may be received from a mobile device of the user. The indication whether the user is requesting continued temporary use of the electric vehicle originated from a mobile device of the user may be received via a remote electric vehicle sharing management system server.

The method in a system for electric vehicle sharing may further include, in response to the received indication whether the user is requesting continued temporary use of the electric vehicle, sending a request for authorization of continued temporary use of the electric vehicle to a remote electric vehicle sharing management system server, and wherein the making the determination whether to release a charged portable electrical power storage device may be based on an authorization of continued temporary use of the electric vehicle received from the remote electric vehicle sharing management system server in response to the sending of the request for authorization of continued temporary use of the electric vehicle by the user.

The making the determination whether to release the portable electrical power storage device from the portable electrical power storage device collection, charging and distribution machine may include making a determination to release the portable electrical power storage device from the portable electrical power storage device collection, charging and distribution machine in response to an authorization signal received from a remote electric vehicle sharing management system server of the electric vehicle sharing management system to release the portable electrical power storage device from the portable electrical power storage device collection, charging and distribution machine. The making the determination whether to release the portable electrical power storage device from the portable electrical power storage device collection, charging and distribution machine may include: receiving, by one or more computer processors of a portable electrical power storage device collection, charging and distribution machine of the electric vehicle sharing system, a request for temporary use of the electric vehicle located in proximity to the portable electrical power storage device collection, charging and distribution machine; in response to the request, authenticating, by one or more computer processors of the portable electrical power storage device collection, charging and distribution machine, the request for temporary use of the electric vehicle; and determining whether to release the portable electrical power storage device from the portable electrical power storage device collection, charging and distribution machine based on the authentication. The request for temporary use of the electric vehicle may be received from a mobile device of the user. The request for temporary use of the electric vehicle originated from a mobile device of the user may be received via a remote electric vehicle sharing management system server.

The method in a system for electric vehicle sharing may further include: receiving, by one or more computer processors of a portable electrical power storage device collection, charging and distribution machine at which the portable electrical power storage device is being returned to, an indication that the user is requesting to terminate temporary use of the electric vehicle; and in response to verification that the portable electrical power storage device has been returned to the portable electrical power storage device collection, charging and distribution machine at which the portable electrical power storage device is being returned to, recording, by one or more computer processors of the portable electrical power storage device collection, charging and distribution machine, data indicative that the temporary use by the user of the electric vehicle has been terminated.

The method in a system for electric vehicle sharing may further include verifying that the electric vehicle is in proximity to the portable electrical power storage device collection, charging and distribution machine at which the portable electrical power storage device has been returned to before the recording the data indicative that the temporary use by the user of the electric vehicle has been terminated.

The method in a system for electric vehicle sharing may further include, in response to the recording the data indicative that the temporary use by the user of the electric vehicle has been terminated, sending, by the portable electrical power storage device collection, charging and distribution machine at which the portable electrical power storage device has been returned to, a signal causing the electric vehicle to be disabled or locked.

The method in a system for electric vehicle sharing may further include, in response to the recording the data indicative that the temporary use by the user of the electric vehicle has been terminated, sending, by the portable electrical power storage device collection, charging and distribution machine at which the portable electrical power storage device has been returned to, a signal causing an account of the user to be charged for the temporary use by the user of the electric vehicle.

The portable electrical power storage device collection, charging and distribution machine at which the portable electrical power storage device is being returned to may be a different portable electrical power storage device collection, charging and distribution machine of the electric vehicle sharing system than the portable electrical power storage device collection, charging and distribution machine that released the portable electrical power storage device.

The method in a system for electric vehicle sharing may further include, in response to the determination, sending, by one or more computer processors of the portable electrical power storage device collection, charging and distribution machine, a signal to enable operation of the electric vehicle for temporary use with the portable electrical power storage device released from the portable electrical power storage device collection, charging and distribution machine.

Being in proximity to the portable electrical power storage device collection, charging and distribution machine may be being within short range wireless signal range from the portable electrical power storage device collection, charging and distribution machine. Being in proximity to the portable electrical power storage device collection, charging and distribution machine may be being within about 10 to 20 meters from the portable electrical power storage device collection, charging and distribution machine.

A system may be summarized as including: at least one computer processor; and at least one memory coupled to the at least one computer processor, the at least one memory having computer executable instructions stored thereon that, when executed, cause the at least one computer processor to: make a determination whether to release a portable electrical power storage device located inside a portable electrical power storage device collection, charging and distribution machine for use in an electric vehicle located in proximity to the portable electrical power storage device collection, charging and distribution machine; in response to the determination, send a signal to release a portable electrical power storage device from the portable electrical power storage device collection, charging and distribution machine for use in the electric vehicle located in proximity to the portable electrical power storage device collection, charging and distribution machine; and in response to sending the signal to release a portable electrical power storage device from the portable electrical power storage device collection, charging and distribution machine, record data indicative that the electric vehicle located in proximity to the portable electrical power storage device collection, charging and distribution machine has been released for temporary use by a user.

The at least one computer processor may be a computer processor of a server machine in communication with and located remotely from the portable electrical power storage device collection, charging and distribution machine. The at least one computer processor may be a computer processor of a mobile device in communication with the portable electrical power storage device collection, charging and distribution machine or an electric vehicle sharing server computer. The computer executable instructions, when executed, may further cause the at least one computer processor to detect that the released charged portable electrical power storage device has been removed from the portable electrical power storage device collection, charging and distribution machine for use in the electric vehicle located in proximity to the portable electrical power storage device collection, charging and distribution machine before the recordation of data indicative that the electric vehicle located in proximity to the portable electrical power storage device collection, charging and distribution machine has been released for temporary use by the user. The computer executable instructions, when executed, may further cause the at least one computer processor to send a signal via a mobile device of the user to unlock a portable electrical power storage device compartment of the electric vehicle.

A non-transitory computer readable storage medium may be summarized as having computer executable instructions stored thereon that, when executed, cause at least one computer processor to: make a determination whether to release a portable electrical power storage device located inside a portable electrical power storage device collection, charging and distribution machine for use in an electric vehicle located in proximity to the portable electrical power storage device collection, charging and distribution machine; in response to the determination, send a signal to release a portable electrical power storage device from the portable electrical power storage device collection, charging and distribution machine for use in the electric vehicle located in proximity to the portable electrical power storage device collection, charging and distribution machine; and in response to the determination, send a signal enabling operation of the electric vehicle for temporary use with the portable electrical power storage device released from the portable electrical power storage device collection, charging and distribution machine.

The determination whether to release the portable electrical power storage device located inside a portable electrical power storage device collection, charging and distribution machine for use in an electric vehicle located in proximity to the portable electrical power storage device collection, charging and distribution machine may be based on a request received from a user via a mobile device of the user. The computer executable instructions, when executed, may further cause the at least one computer processor to: receive an indication that a user is requesting to terminate temporary use of the electric vehicle; in response to the indication that the user is requesting to terminate temporary use of the electric vehicle, verify that the portable electrical power storage device has been returned to a portable electrical power storage device collection, charging and distribution machine; in response to the indication that the user is requesting to terminate temporary use of the electric vehicle, verify that the electric vehicle has been returned to the portable electrical power storage device collection, charging and distribution machine; in response to the verification that the electric vehicle has been returned to the portable electrical power storage device collection, charging and distribution machine, record data indicative that the temporary use by the user of the electric vehicle has been terminated; and based on the received indication that the user is requesting to terminate temporary use of the electric vehicle and in response to the verification that the portable electrical power storage device and electric vehicle has been returned to a portable electrical power storage device collection, charging and distribution machine, send a signal disabling operation of the electric vehicle. The verifying that the vehicle has been returned to a portable electrical power storage device collection, charging and distribution machine may include receiving a periodic beacon sent from the electric vehicle over a short range wireless signal. The computer executable instructions, when executed, may further cause the at least one computer processor to: monitor a location of electric vehicles at the portable electrical power storage device collection, charging and distribution machine by receiving periodic beacons sent from the electric vehicles in proximity to the portable electrical power storage device collection, charging and distribution machine over a short range wireless signal; and if a beacon has not been received by the portable electrical power storage device collection, charging and distribution machine from an electric vehicle within a predetermined amount of time and the electric vehicle has not been authorized for temporary use, then send an alert indicating a possible missing electric vehicle.

In some embodiments, the at least one processor includes at least one processor of a remote server that the computer executable instructions cause to make the determination and at least one processor of a collection, charging and distribution machine that the computer executable instructions cause to send the signal to release the portable electrical power storage device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance, rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
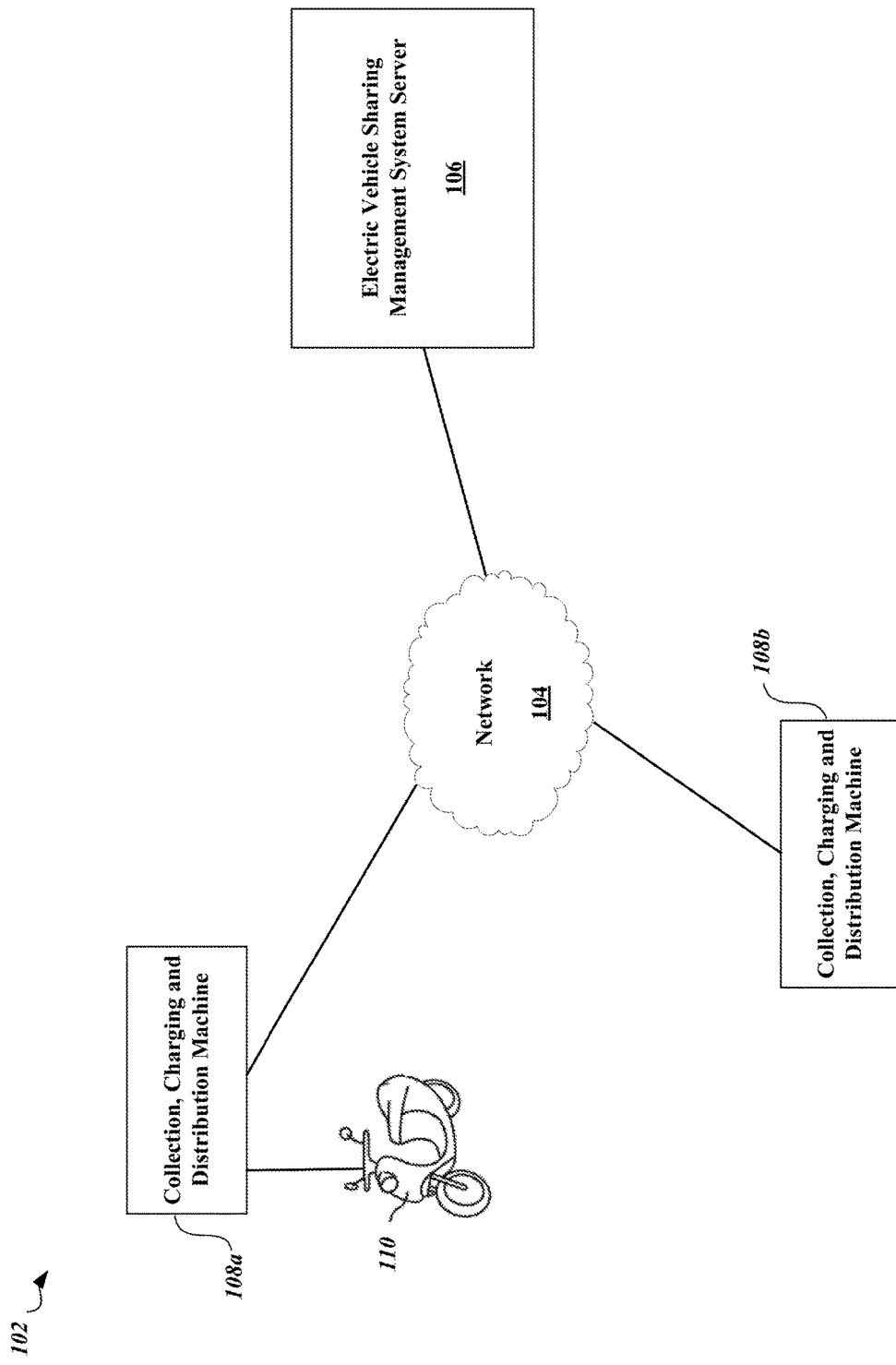
FIG. 1 is a schematic view of a system for electric vehicle sharing, according to one non-limiting illustrated embodiment.

FIG. 1 is a schematic view of a system for electric vehicle sharing 102, according to one non-limiting illustrated embodiment.

Shown is an example collection, charging and distribution machine 108a, an example collection, charging and distribution machine 108b, an example electric vehicle 110, an example electric vehicle sharing management system server 106 and an example network 104. Although only one electric vehicle 110 is shown, there may be multiple electric vehicles within the system for electric vehicle sharing 102. Reference to electric vehicle 110 is reference to all such electric vehicles within the system for electric vehicle sharing 102. Although only two collection, charging and distribution machines are shown, there may be fewer or more collection, charging and distribution machines in the system for electric vehicle sharing 102. Reference to one collection, charging and distribution machine, such as collection, charging and distribution machine 108a or 108b, is reference to all such collection, charging and distribution machines in the system for electric vehicle sharing 102.

The collection, charging and distribution machine 108a may take the form of a vending machine or kiosk. The collection, charging and distribution machine 108a has a plurality of receivers, compartments or receptacles to removably receive portable electrical energy storage devices (e.g., batteries, supercapacitors or ultracapacitors) for collection, charging and distribution. For example, the collection, charging and distribution machine 108a and the associated portable electrical storage device that may be collected, charged and distributed by the collection, charging and distribution machine 108a may be those such as disclosed in U.S. Patent Application Publication No. 2013/0026971A1, which is incorporated herein by reference in its entirety and/or U.S. Provisional Patent No. 62/045,982, which is also incorporated herein by reference in its entirety. U.S. Patent Application Publication No. 2013/0026971A1 and U.S. Provisional Patent No. 62/045,982 also disclose example operation and implementation of the collection, storage and distribution features of the collection, charging and distribution machine 108a within an example operating environment. For example, the collection, charging and distribution machine 108a illustrated in FIG. 1 may have a capacity capable of simultaneously holding 40, 80 or 120 portable electrical energy storage devices for use by electric vehicles such as electric vehicle 110.

The portable electrical energy storage devices may take a variety of forms, for example, batteries (e.g., array of battery cells) or supercapacitors or ultracapacitors (e.g., array of ultracapacitor cells). For example, the portable electrical energy storage devices may take the form of rechargeable batteries (i.e., secondary cells or batteries). The portable electrical energy storage devices may, for instance, be sized to physically fit, and electrically power, personal transportation vehicles, such as all-electric scooters or motorbikes represented by electric vehicle 110. As previously noted, combustion engine scooters and motorbikes are common in many large cities, for example, in Asia, Europe, South America and the Middle East. The ability to conveniently access electric vehicles for sharing and charged batteries for those vehicles throughout a city or region may allow the use of all-electric scooters and motorbikes represented by electric vehicle 110 in place of combustion engine scooters and motorbikes, thereby alleviating air pollution, as well as reducing noise.

The collection, charging and distribution machine 108a is positioned at some location at which the collection, charging and distribution machine 108a is conveniently and easily accessible by various end users. The location may take any of a large variety of forms, for example, a retail environment such as a convenience store, supermarket, gas or petrol station, or service shop. Alternatively, the collection, charging and distribution machine 108a may stand alone at a location 112 not associated with an existing retail or other business, for example, in public parks or other public places.

Thus, for example, collection, charging and distribution machines 108a and 108b may be located at convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines, for example, collection, charging and distribution machine 108a, collection, charging and distribution machine 108b and other collection, charging and distribution machines, to be quickly developed in a city or region. Quickly achieving a large network which is geographically well distributed to serve a target population enhances the ability to depend on such a system and likely commercial success of such an effort. Providing a system in which users who use the collection, charging and distribution machines (e.g., such as collection, charging and distribution machine 108a) can also rent or otherwise share electric vehicles, such as electric vehicle 110, located in proximity to such collection, charging and distribution machines also enhances the commercial success of such an effort.

The collection, charging and distribution machines 108a and 108b may be communicatively coupled to one or more remotely located computer systems, such as electric vehicle sharing management system server (only one shown) 106. The electric vehicle sharing management system server 106 may collect data from and/or control a plurality of collection, charging and distribution machines including collection, charging and distribution machine 108a and 108b distributed about an area, such as a city. The electric vehicle sharing management system server 106 may also control all or some of the operations of the electric vehicle sharing system described herein, including the rental or other sharing of electric vehicles such as electric vehicle 110. For example, the electric vehicle sharing management system server 106 may store, maintain and/or access a customer or subscriber database of those users who share electric vehicles, such as electric vehicle 110; authorize requests for temporary use of electric vehicle 110; store, maintain and/or access a database of electric vehicles, including electric vehicle 110, that are available for temporary use, including status of such vehicles; control security of electric vehicle 110; track which users are currently temporarily using such electric vehicles and which electric vehicles they are using; track location of electric vehicles such as electric vehicle 110; track temporary use time or mileage for electric vehicle 110 during its temporary use; enable or disable operation of electric vehicle 110, for example, to begin or end a temporary use session of electric vehicle 110; track and/or respond to problem reports regarding electric vehicle 110; unlock the electric vehicle 100 and/or a compartment of the electric vehicle 110 in which a portable electrical power storage device is placed; determine whether to release a portable electrical power storage device from the portable electrical power storage device collection, charging and distribution machine 108a for use in the electric vehicle 110; authorize continued temporary use of electric vehicle 110; or perform other operations and/or functions described herein of the various systems for electric vehicle sharing. In some embodiments, some or all of these functions and operations may be controlled instead by the collection, charging and distribution machine 108a or other collection, charging and distribution machine at which the electric vehicle 110 is located. In some embodiments, a sending of a signal causing operation of the electric vehicle to be disabled may include sending a signal causing a key for operation of the electric vehicle to be invalid.

The communications may occur over one or more communications channels, including one or more networks, represented by network 104, or non-networked communications channels. Communications may be over one or more wired communications channels (e.g., twisted pair wiring, optical fiber), wireless communications channels (e.g., radio, microwave, cellular, satellite, 801.11 compliant). Networked communications channels may include one or more local area networks (LANs), wide area networks (WANs), extranets, intranets, or the Internet including the Worldwide Web portion of the Internet. For example, the communicable coupling between the collection, charging and distribution machine 108a, collection, charging and distribution machine 108b and electric vehicle sharing management system server 106 may include a wired communicable coupling (e.g., via Ethernet, plain old telephone service, and the like) or wireless communicable coupling (e.g., via cellular connection such as GSM, CDMA, or via a wireless network connection such as IEEE 802.11, Internet, and the like) or combinations thereof. In some instances, the collection, charging and distribution machine 108a may have multiple communicable couplings (e.g., one connection via terrestrial wired POTS and a second via wireless cellular or satellite) with the electric vehicle sharing management system server to provide redundant and/or failover communications capabilities.

The collection, charging and distribution machine 108a may include a user interface including of input/output (I/O) devices to allow an end user to interact with the collection, charging and distribution machine 108a. Various I/O devices are called out and described in U.S. Patent Application Publication No. 2013/0026971A1 and U.S. Provisional Patent No. 62/045,982. In some implementations, the collection, charging and distribution machine 108a may optionally include I/O devices that communicate data read or otherwise obtained by the I/O device to the electric vehicle sharing management system server 106. For example, a cash or currency (i.e., bill, coin, and/or token) acceptor may be communicably coupled to the collection, charging and distribution machine 108a to permit the acceptance of cash payments (i.e., point-of-sale or subscription payments) at the collection, charging and distribution machine 108a for electric vehicle sharing. In another example, a magnetic stripe reader may be communicably coupled to the collection, charging and distribution machine 108a to permit the acceptance of credit and/or debit card payments, electronic currency payments and also to permit the use of subscriber identification cards with the collection, charging and distribution machine 108a for sharing of electric vehicles.

In another example, a near field communication (NFC), Bluetooth or other short-range wireless communications interface may be communicably coupled to the collection, charging and distribution machine 108a. Such short-range wireless communication interfaces permit the collection, charging and distribution machine 108a to obtain data from subscriber identification tokens (e.g., key fobs, cards, medallions, mobile devices, or the like) and/or communicate with the vehicle 110 to obtain vehicle information (e.g., rental or temporary use status, vehicle location beacon signals, vehicle portable electrical power storage device status, maintenance, service, and similar diagnostic information) from the electric vehicle 110. The collection, charging and distribution machine 108a may also be in wireless communication with the electric vehicle to control vehicle functions, including, but not limited to: enabling or disabling operation of the electric vehicle 110, locking or unlocking the electric vehicle 110 and/or a portable electrical power storage device compartment in the electric vehicle 110, flashing or turning off or turning on the lights of the electric vehicle 110 to identify the electric vehicle 110 to a user, activating a horn or other audio signal of the electric vehicle 110 to identify the electric vehicle 110 to a user, turning on the electric vehicle, turning off the electric vehicle, turning on and/or turning off one or more electrical systems of the electric vehicle, engaging or disengaging a wheel locking mechanism of the electric vehicle 110, engaging or disengaging a kill switch mechanism of the electric vehicle 110, etc. For example, control of such functions may be used in conjunction with initiating and/or ending a temporary use session of the electric vehicle 110 at collection, charging and distribution machine 108a or collection, charging and distribution machine 108b, or to secure the electric vehicle 110 while not being used.

In one example embodiment, a collection, a charging and distribution machine, such as collection, charging and distribution machine 108a, has one or more electric vehicles, such as electric vehicle 110, located in proximity to the collection, charging and distribution machine that are available for temporary use. There are a number of security measures which may be used in addition to or instead of those described above that the system 102 may employ to track and manage the electric vehicles within the system 102 that are available for sharing or other temporary use by users. For example, each electric vehicle in the system 102 may be identified by an identification number which is stored and maintained in a database by the collection, charging and distribution machine 108a and/or the electric vehicle sharing management system server 106, or accessible by the collection, charging and distribution machine 108a and/or the electric vehicle sharing management system server 106. The collection, charging and distribution machines in the system 102 may receive wireless beacons from the electric vehicles in the system 102, which each includes the identification number (which may be encrypted) of the electric vehicle from which the beacon originates. For example, collection, charging and distribution machine 108a may receive a wireless beacon from electric vehicle 110 over a Bluetooth or other short range wireless signal. The wireless beacon received from electric vehicle 110 includes the identification number of electric vehicle 110, so collection, charging and distribution machine 108a can track whether electric vehicle 110 is in proximity to collection, charging and distribution machine 108a. Thus, such proximity can be based on the range of the short range wireless signal. For example, this may be 10 to 20 meters in some embodiments. In other embodiments, it may be less or more than that. If such a beacon has not been received from electric vehicle 110 within a predetermined period of time (e.g., five minutes) and the electric vehicle 110 has not been released for temporary use, or has exceeded a temporary use time limit, then the electric vehicle sharing management system server 106 or an individual collection, charging and distribution machine, such as collection, charging and distribution machine 108a, may take an action, such as reporting the electric vehicle missing such that further action may be taken to address the issue. Such actions may include charging the user to whom the missing electric vehicle was released but did not return the electric vehicle 110, placing an outgoing call or message to the user, or making a service call to investigate the issue.

In the example embodiment, a user approaches the collection, charging and distribution machine 108a to initiate a reservation of an electric vehicle, such as electric vehicle 110, located in proximity to the collection, charging and distribution machine 108a. The user may select a particular electric vehicle, such as identifying it to the collection, charging and distribution machine 108a through a user interface of the collection, charging and distribution machine 108a by an electric vehicle identification number displayed on the electric vehicle 110. Alternatively, the system 102 may select one of the electric vehicles that are available in proximity to the collection, charging and distribution machine 108a. The collection, charging and distribution machine 108a will release charged portable electrical power storage devices from the collection, charging and distribution machine 108a for use in electric vehicle 110 and flash the lights on the electric vehicle 110, as well as open the compartment in the electric vehicle 110 in which the portable electrical power storage devices will be placed by the user. The user then places the portable electrical power storage devices in the compartment and starts the electric vehicle 110 and rides away, thus starting his or her temporary use session. The user exchanges the portable electrical power storage devices when depleted for charged portable electrical power storage devices at various collection, charging and distribution machines, such as collection, charging and distribution machine 108b, as needed, such as described in U.S. Patent Application Publication No. 2013/0026971A1 and U.S. Provisional Patent No. 62/045,982. Upon an exchange of a portable electrical power storage device at a collection, charging and distribution machine, such as collection, charging and distribution machine 108b, the user will be given a chance to terminate their temporary use session (e.g., terminate their rental) or continue at the user interface of the collection, charging and distribution machine 108b. Upon end of their temporary use session, the user places the portable electrical power storage device into a collection, charging and distribution machine, such as collection, charging and distribution machine 108b, and opts to terminate the user's temporary use session. The collection, charging and distribution machine 108b may also confirm the electric vehicle 110 has been returned by sensing the wireless beacon of the electric vehicle 110 as described above.

The payment or a deposit for the temporary use session may be prepaid or partially pre-paid at collection, charging and distribution machine 108a at the start of the temporary use session, and the balance due paid in full at the collection, charging and distribution machine 108b at the point the user terminates their temporary use session of the electric vehicle 110. In other embodiments, the entire payment is made at the point the user terminates their temporary use session of the electric vehicle 110. In yet other embodiments, periodic subscription payments are made instead of or in addition to payments associated with a particular temporary use session. Payments for the temporary use session and/or subscription payments may be made automatically by debiting an account of the user or charging a subscriber account of the user or a credit card account of the user when the subscription payment is due or when the applicable temporary use session payment is due for a particular temporary use session. In various embodiments, the user may be charged in association with the temporary use session or sessions based on one or more of: time, time between start and end of temporary use session, time electric vehicle was in use during temporary use session, distance traveled, area traveled within, area(s) traveled to, motor running time, parking fees, toll road fees, parking tickets, traffic tickets, traffic fines, taxes, length of time electric vehicle was turned on during temporary use session, electrical energy use, portable electrical power storage device discharge rate and/or amount, portable electrical power storage device exchanges made, locations traveled to, damage to electric vehicle or portable electrical power storage device, vehicle and/or operator insurance coverage selection by user, time of day of temporary use session, type of portable electrical power storage device used or selected by user, performance of portable electrical power storage device used or selected by user, type of subscriber account of user, level of subscriber account of user, type of electric vehicle used, options of electric vehicle selected or used, performance of electric vehicle used, location collection, charging and distribution machine electric vehicle was located at, location of collection, charging and distribution machine electric vehicle was returned to, electric vehicle replacement charges, selections by user to switch to a different electric vehicle for temporary use, etc.

In some embodiments, an alert may be sent to the user's mobile device or to the electric vehicle the user is temporarily using to warn or indicate to the user that the electric vehicle the user is temporarily using has traveled, or is getting near to traveling (e.g., within 5 kilometers, 1 kilometer, 500 meters, or other distance) outside a determined area. The alert may also indicate how for outside the electric vehicle is from the determined area. For example, the determined area may be a city, region, neighborhood, political boundary or other area selectable or determined by the user or operator of the system 102. In some embodiments, the alert may include, but is not limited to, a warning of different levels based on how close the electric vehicle is to the boundary of the determined area, information on what will occur if the vehicle exits the determined area (e.g., extra charges or penalties, vehicle shut down), time constraints for reentering the determined area, information or directions regarding how to reenter the determined area and/or information regarding additional charges for exiting the determined area.

The mobile device of the user, the user interface or navigation system of the electric vehicle, and/or the electric vehicle sharing management system server 106 may be informed of the location of the electric vehicle 110 at any time by GPS signals or other location data sent from a GPS module disposed in the electric vehicle 110 received via a telecommunications system or otherwise received via network 104. Thus, in some embodiments, this location data and/or alert indicating the electric vehicle the user is temporarily using has traveled, or is getting near to traveling, outside a determined area may be communicated to the electric vehicle 110 and/or the mobile device of the user from the electric vehicle sharing management system server 106. Such GPS data may also be received from a GPS unit disposed in the mobile device of the user. The alert may be displayed on the user interface of the mobile device of the user or the electric vehicle that the user is temporarily using as a textual message, graphical image and/or provided by an audio alarm or sound emanating from the mobile device of the user and/or the electric vehicle.

Figure 2:
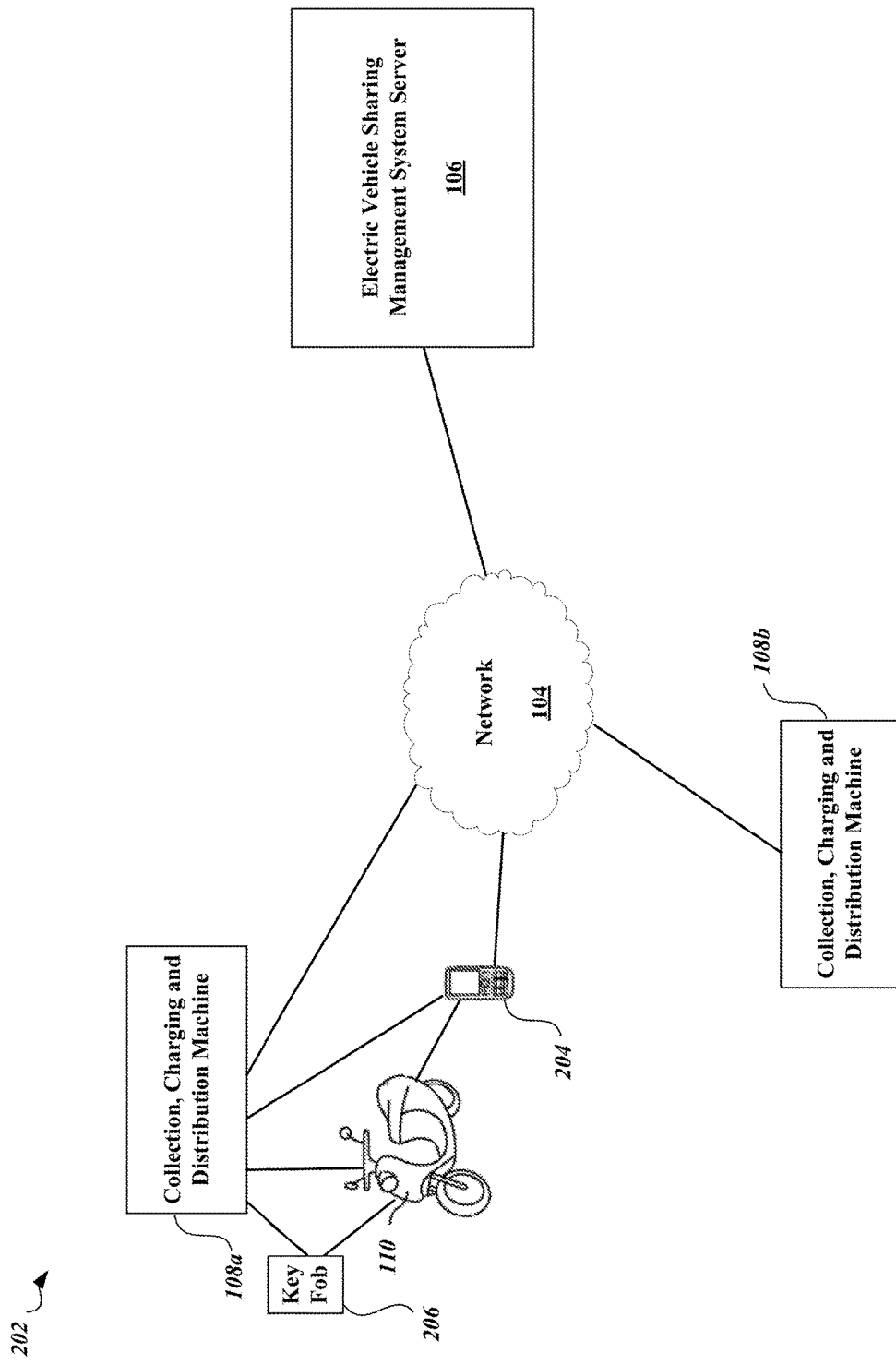
FIG. 2 is a schematic view of a system for electric vehicle sharing, according to another non-limiting illustrated embodiment.

FIG. 2 is a schematic view of a system for electric vehicle sharing 202, according to another non-limiting illustrated embodiment.

In addition to the items shown in FIG. 1, shown in FIG. 2 is a key fob 206 in operable communication with the collection, charging and distribution machine 108a and the electric vehicle 110 as well as a mobile device 204 of a user in operable communication with the collection, charging and distribution machine 108a, the electric vehicle 110, electric vehicle sharing management system server 106 and collection, charging and distribution machine 108b via network 104. The key fob may be in operable communication with the collection, charging and distribution machine 108a and electric vehicle 110 over a short range wireless signal, such as Bluetooth or other short range wireless signal. The mobile device 204 may also be in operable communication with the collection, charging and distribution machine 108a and electric vehicle 110 over a short range wireless signal, such as Bluetooth or other short range wireless signal and may also or instead be in operable communication with the collection, charging and distribution machine 108a via network 104.

In some embodiments, a user completes a reservation of an electric vehicle for temporary use on the mobile device 204 of the user. The mobile device 204 may be, for example, a smartphone or other portable wireless communications device. Some examples of user mobile devices having operating systems for which the functionality described herein may be implemented via an application running on the operating system of the mobile device include, but are not limited to: iPhone® mobile devices, Samsung® mobile devices, Android® devices, Windows® mobile devices, Blackberry® mobile devices, other smartphone and/or tablet devices, etc. The user interfaces with an application running on the mobile device 204 to communicate the request for temporary use of an electric vehicle from the mobile device 204 to the electric vehicle sharing management system server via network 104. The user may have an account associated with the electric vehicle sharing system 202 and may thus be required to log in to the account in order to request or reserve an electric vehicle for temporary use. The user's account may be tied to a credit card, subscription or other account of the user to be charged for the temporary use of the electric vehicle 110. In some embodiments, this account may be the same or associated with an account the user may have for use of the collection, charging and distribution machine 108a to exchange portable electrical power storage devices of an electric vehicle owned or leased by the user. Such accounts may be stored, maintained and/or accessible by electric vehicle sharing management system server 106 or by collection, charging and distribution machine 108a via network 104. The user may also make such a request for temporary use of an electric vehicle in advance via a desktop computer or other computing device (not shown) connected to network 104. In some embodiments, the user may request a specific electric vehicle and identify the specific electric vehicle by providing identification data for the electric vehicle such as a license plate number or other data identifying the requested electric vehicle as part of or in conjunction with the request for temporary use.

In response to the request, the electric vehicle sharing management system server may check in its database which electric vehicles are available at the user's current or requested location (which may be the collection, charging and distribution machine 108a or other location) and if applicable, if the specific electric vehicle requested by the user is available. In some embodiments, the user's location may be provided by the user or provided by a global positioning system (GPS) data communicated from the mobile device 204 of the user. In other alternative embodiments, if the user is already at collection, charging and distribution machine 108a, the request may be communicated from the mobile device 204 to collection, charging and distribution machine 108a via a short range wireless network or via network 104, and the collection, charging and distribution machine 108a handles the request and makes the reservation based on available electric vehicles, such as electric vehicle 110, in proximity to collection, charging and distribution machine 108a. In some embodiments, the request and the reservation are communicated from the collection, charging and distribution machine 108a to the electric vehicle sharing management system server 106 and/or authorized by the electric vehicle sharing management system server 106.

If the request for temporary use is granted, the collection, charging and distribution machine 108a or electric vehicle sharing management system server 106 communicates to the user which electric vehicle (in this example, electric vehicle 110) has been selected for the user's temporary use. For example, the license plate number or other data identifying the electric vehicle and/or the electric vehicle location (location of collection, charging and distribution machine 108a at which electric vehicle is located, stall number of electric vehicle, parking spot number of electric vehicle, street corner or address, GPS coordinates, etc.) may be communicated to the mobile device 204 of the user. If it is known the user is already at the collection, charging and distribution machine 108a location (e.g., if the user made the request vis the collection, charging and distribution machine 108a or the user otherwise indicated the user is at collection, charging and distribution machine 108a), the collection, charging and distribution machine 108a may also communicate a signal to the electric vehicle 110 to flash its lights and/or make an audible signal to identify the electric vehicle 110 to the user. The user then approaches electric vehicle 110 and uses the user's mobile device as a key to turn on and use electric vehicle 110, thus initiating the user's temporary use session of electric vehicle 110. This may be performed, for example, by communication of security credentials from the collection, charging and distribution machine 108a and/or the electric vehicle sharing management system server 106 to the mobile device 204 (which may be encrypted) associated with the account of the user. These security credentials are recognized by a security system of the electric vehicle 110 in order to enable operation of the electric vehicle 110 for use. Such security credentials may be valid for a limited duration until the user terminates the temporary use session.

The electric vehicle 110 may or may not have a portable electrical power storage device already inside the electric vehicle 110 at the point the user initiates the temporary use session. In some embodiments, if electric vehicle 110 already has a portable electrical power storage device inside the electric vehicle 110 at the point the user initiates the temporary use session, then the user may be alerted of this via data received from the electric vehicle 110. Such data may indicate the presence of portable electrical power storage device in the electric vehicle and other data regarding the portable electrical power storage device, such as status, health and charge level. This data may be communicated from the electric vehicle 110 to a mobile device of the user or may be displayed on a user interface of the electric vehicle 110. This data may also be communicated from the electric vehicle 110 or from the collection, charging and distribution machine 108a to the electric vehicle sharing management system server 106 via network 104 and then to the mobile device of the user. The user may then be given the opportunity by the system 102 to exchange the portable electrical power storage device currently in the electric vehicle with a fully charged portable electrical power storage device at the collection, charging and distribution machine 108a or at the nearest collection, charging and distribution machine if the electric vehicle is not located at a collection, charging and distribution machine when the temporary use process is initiated.

In some embodiments, the user may return the electric vehicle 110 to any collection, charging and distribution machine within the electric vehicle sharing system 202. In other embodiments, the user may only return the electric vehicle to the same collection, charging and distribution machine 108a at which the user found the electric vehicle 110, or to a limited number of collection, charging and distribution machines within the electric vehicle sharing system 202. For example, the user may be charged different amounts for the ability to return the electric vehicle 110 to any collection, charging and distribution machine or certain collection, charging and distribution machines within specified areas. The initial and final location of the electric vehicle 110 may be verified via the collection, charging and distribution machine 108a from which the electric vehicle 110 was taken, and the collection, charging and distribution machine 108b to which the electric vehicle 110 is retuned, by the respective collection, charging and distribution machine sensing a short range wireless beacon of the electric vehicle 110. In this way, the electric vehicle sharing management system server 106 would know the electric vehicle 110 was within approximately ten or twenty meters (or otherwise within short range wireless signal range) of the respective collection, charging and distribution machine and could track the electric vehicle 110 accordingly.

During the temporary use session, the user may turn on or turn off the electric vehicle 110 using the mobile device 204 as a key. In some alternative embodiments, turning off the electric vehicle 110 may cause the temporary use session to be paused and thus the associated charges to be paused or reduced. During the temporary use session, the user may exchange portable electrical power storage devices of the electric vehicle 110 for fully charged portable electrical power storage devices at any collection, charging and distribution machine within the electric vehicle sharing system 202. In some alternative embodiments, the user may exchange portable electrical power storage devices of the electric vehicle 110 for fully charged portable electrical power storage devices only at some select collection, charging and distribution machines within the electric vehicle sharing system 202.

The user may terminate the temporary use session by returning and "checking in" the electric vehicle 110 at a collection, charging and distribution machine via the user's mobile device 204. The collection, charging and distribution machine 108b at which the user is returning the electric vehicle 110 and/or the electric vehicle sharing management system server 106 receives the request originating from the mobile device 204 to terminate the temporary use session. Once the collection, charging and distribution machine 108b detects the electric vehicle 110 is in proximity to the collection, charging and distribution machine 108b or other authorized location (e.g., by the collection, charging and distribution machine 108b receiving a wireless beacon from the electric vehicle 110) and/or the electric vehicle sharing management system server 106 confirms via the collection, charging and distribution machine 108b that the electric vehicle 110 is in proximity to the collection, charging and distribution machine 108b, the request to terminate the temporary use session may be granted. In some embodiments, determining whether the electric vehicle 110 is in an authorized location at which the vehicle may be returned includes querying other electric vehicles in the electric vehicle sharing system 202 to receive information collected from the other electric vehicles regarding where the other electric vehicles have received a beacon from the electric vehicle indicative of a location of the electric vehicle. This may also be used to track the location of the electric vehicle 110 during the temporary use session of the electric vehicle 110. An example of a system for asset tracking that is suitable for tracking the location of the electric vehicle 110 in the system for sharing electric vehicles as described herein is disclosed in U.S. Patent Application Ser. No. 62/090,240, which is herein incorporated by reference in its entirety.

The collection, charging and distribution machine 108b may then send a signal to unlock or open a portable electrical power storage device compartment of the electric vehicle 110. The user may be required to take the portable electrical power storage device(s) from the compartment and place the portable electrical power storage device(s) of the electric vehicle 110 into the collection, charging and distribution machine 108b in order to terminate the temporary use session. Once the collection, charging and distribution machine 108b verifies the portable electrical power storage device(s) have been placed in the collection, charging and distribution machine 108b, the collection, charging and distribution machine 108b may then send a signal to turn off, shut down, lock or otherwise disable the electric vehicle 110 and will then charge an account of the user, if applicable, for the temporary use session of the electric vehicle 110. The electric vehicle sharing management system server 106 and/or the collection, charging and distribution machine 108b at which the user is returning the electric vehicle 110 may also deactivate or remove the security credentials sent to the user's mobile device 204 so that the user's mobile device may no longer be used as a key to turn on or start the electric vehicle 110. The electric vehicle 110 will then be ready for another temporary use session by another user. In other embodiments, the user may terminate the temporary use session by returning and "checking in" the electric vehicle 110 at collection, charging and distribution machine 108b via a user interface of collection, charging and distribution machine 108b at which the user is returning the electric vehicle 110.

In some embodiments, the user may have a contract for rental service provided by the electric vehicle sharing system 202. In such an embodiment, the user may be provided with a key fob 206. The key fob 206 does not link to any particular electric vehicle, but is instead used to initiate rental sessions at collection, charging and distribution machines within the system 202, such as collection, charging and distribution machine 108a, for example. Upon initiating a rental session, the collection, charging and distribution machine 108a will initiate a disposable, time-limited authorization associated with the key fob 206. The authorization causes the key fob 206 to be tied to a particular electric vehicle located in proximity to collection, charging and distribution machine 108a, such as electric vehicle 110. The time limit may be for a period much longer than the expected duration. For example, if the user wants to rent the electric vehicle for 3 hours, then the ultimate time limit will be set to 24 hours. That key fob 206 will then let the user operate the electric vehicle 110 as if it were the user's own electric vehicle. Upon completion of the rental, the user will again initiate a portable electrical power storage device return at a collection, charging and distribution machine, such as collection, charging and distribution machine 108b, and select the option to terminate the session. The collection, charging and distribution machine 108b will verify the presence of the nearby electric vehicle 110 as described above and confirm it is locked. The collection, charging and distribution machine 108b will send a signal to cause the key fob 206 to no longer be able operate the electric vehicle 110 after terminating the session. If the user doesn't return the electric vehicle 110 to a collection, charging and distribution machine within the system 202, after the initial agreed upon rental period (for example, 3 hours), then some grace period will elapse and finally an ultimate time limit will expire and the key fob 206 will render itself inoperative. In some embodiments, the mobile device 204 of the user may instead perform the actions described above of the key fob 206 above and thus act as the key fob 206. As described above, during the temporary use session, the user may exchange portable electrical power storage devices of the electric vehicle 110 for fully charged portable electrical power storage devices at any collection, charging and distribution machine within the electric vehicle sharing system 202.

Figure 3:
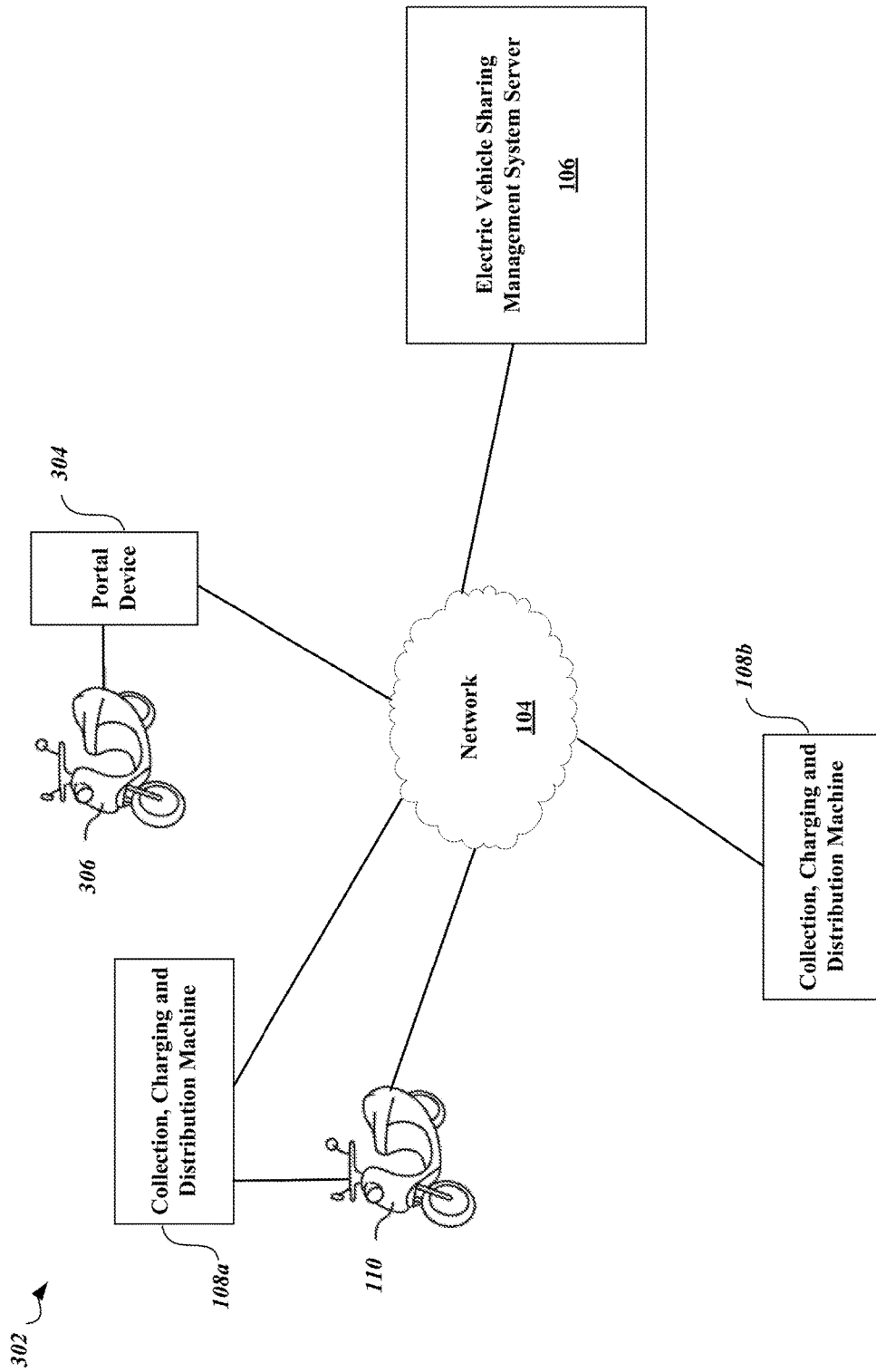
FIG. 3 is a schematic view of a system for electric vehicle sharing, according to yet another non-limiting illustrated embodiment.

FIG. 3 is a schematic view of a system for electric vehicle sharing 302, according to yet another non-limiting illustrated embodiment. In addition to the items shown in FIG. 1, shown in FIG. 3 is a portal device 304 in operable communication with the electric vehicle 306 and in operable communication with the electric vehicle sharing management system server 106. The portal device has the functionality described herein of the collection, charging and distribution machine 108a except that it does not collect, charge or distribute portable electrical power storage devices. It is rather just for performing the functions of facilitating the temporary use (e.g., rental and sharing) of the electric vehicles, such as electric vehicle 110, within the system for electric vehicle sharing 302. In this way, the user may initiate and terminate temporary use sessions of electric vehicles as described herein at the portal device 304, which may also have a user interface as described herein for facilitating performing those functions. Like collection, charging and distribution machines, such portal devices may also be collection points of electric vehicles for temporary use as described herein. Although only one portal device is shown, additional such portal devices may be part of the system for electric vehicle sharing 302.

In some embodiments, the electric vehicle 110 need not be returned to a collection, charging and distribution machine or a portal devoice, but may be returned to any authorized area. For example, users can return or otherwise park the electric vehicle 110 anywhere in the city or other region. In some embodiments, the authorized area be, but is not limited to, an officially designated parking space beside the sidewalk, along a curb or at a street corner, a designated lane, a parking space in a parking lot, a parking space in a parking garage, a particular building or designated area within a building or a stall in a designated rack. In some embodiments, the electric vehicle sharing management system server 106 receives a request to terminate temporary use of electric vehicle 110 in use by a user via the user's mobile device 204 (shown in FIG. 2) or from a user interface of the electric vehicle 110. The system, in response to the request to terminate temporary use of the electric vehicle, determines a level of charge of a portable electrical power storage device of the electric vehicle 110. This may be communicated from the electric vehicle 110 or from the electric vehicle 110 via the user's mobile device 204. Based on the determined level of charge of a portable electrical power storage device of the electric vehicle 110, the electric vehicle sharing management system server 106 determines whether to grant the request to terminate temporary use of the electric vehicle 110. If it is determined to grant the request to terminate temporary use of the electric vehicle 110, the electric vehicle sharing management system server 106 sends a signal causing operation of the vehicle to be disabled. This signal may be sent from the electric vehicle sharing management system server 106 to the electric vehicle 110 via network 104 and/or to the mobile device 104 of the user, which then communicates it to the electric vehicle 110. The electric vehicle sharing management system server 106 may also confirm the electric vehicle is within an authorized location or area via a Global Positioning System (GPS) signal received from the electric vehicle 110 and/or the user's mobile device 204.

The user and/or the electric vehicle sharing management system server 106 may be informed of the location of the electric vehicle 110 at any time by GPS signals or other location data sent from a GPS module disposed in the electric vehicle 110 received via a telecommunications system or otherwise received via network 104. For example, the GPS signals or other location data may be used by the vehicle sharing management system server 106 to verify that the electric vehicle 110 is at a legitimate parking space or other authorized area when the electric vehicle 110 is returned or temporarily parked during the rental or sharing period. The communication to the user of the GPS signals or other location data may be made via the user's mobile device or by a user interface within the electric vehicle 110.

In some embodiments, the electric vehicle sharing management system server 106 and/or the user's mobile device may store information indicating the last location at which the vehicle 110 was returned or parked when terminating the rental or sharing procedure and use this information to learn the location of the electric vehicle 110. Other data like photos or video recorded by a camera of the user or recorded by recording equipment at authorized areas may be communicated to the electric vehicle sharing management system server 106 to ensure that the scooter is at a legitimate parking space or other authorized area when the electric vehicle 110 is returned or temporarily parked during the rental or sharing period. In some embodiments, such image or video data may include data identifying the electric vehicle, such as a license plate number or vehicle number. Such information may be sent directly from the user's mobile device or from the recording equipment installed at authorized areas to the vehicle sharing management system server 106 via network 104. The raw image data may be sent, or in some embodiments, data identifying the electric vehicle is extracted from the captured image data by the recording device or other device and sent to the vehicle sharing management system server 106 via network 104. Such recording equipment at authorized areas may be record the corresponding image or video data as part of the electric vehicle return process or may continuously record image data to capture the image identifying the electric vehicle 110.

If it is determined to not grant the request to terminate temporary use of the electric vehicle, the electric vehicle sharing management system server 106 sends a signal to the electric vehicle 110 and/or the mobile device 204 of the user to prompt the user to return the electric vehicle to a portable electrical power storage device collection, charging and distribution machine so that the portable electrical power storage device can be placed in the portable electrical power storage device collection, charging and distribution machine for charging before the temporary use of the electric vehicle can be terminated.

Figure 4:
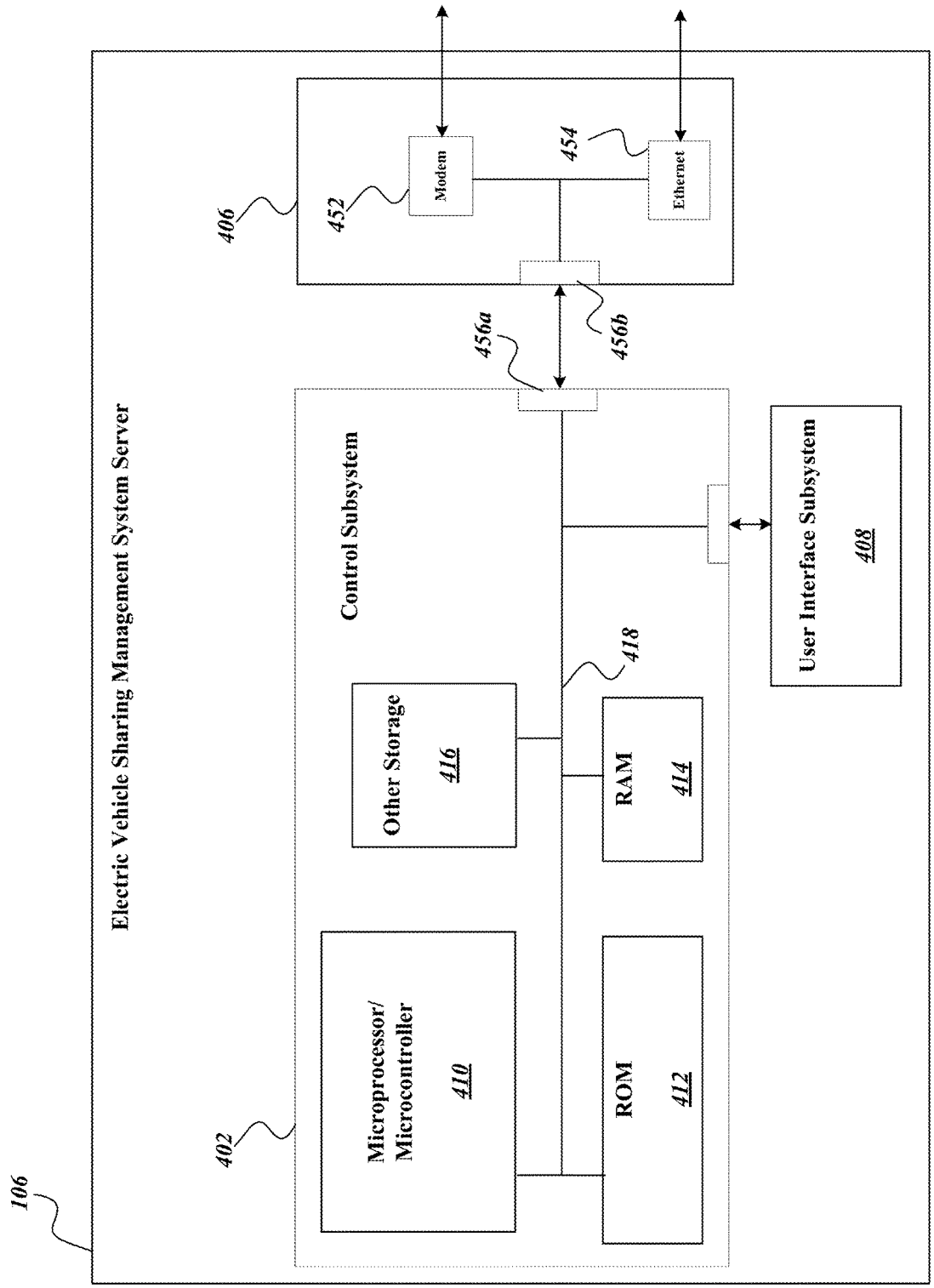
FIG. 4 is a schematic view of the electric vehicle sharing management system server of FIGS. 1 through 3, according to one non-limiting illustrated embodiment.

FIG. 4 is a schematic view of the electric vehicle sharing management system server of FIGS. 1 through 3, according to one non-limiting illustrated embodiment.

The electric vehicle sharing management system 302 includes a control subsystem 402, a communications subsystem 406, and a user interface subsystem 408. However, such a system and associated functionalities, or operable sub-components thereof, may also be present in one or more of: the collection, charging and distribution machine 108a, collection, charging and distribution machine 108b, mobile device 204, electric vehicle 110 and key fob 206.

The control subsystem 402 includes a controller 410, for example, a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The control subsystem 402 may also include one or more non-transitory processor- or computer-readable storage media, for example, read only memory (ROM) 412, random access memory (RAM) 414, and data store 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The control subsystem 402 may include one or more buses 418 (only one illustrated) coupling various components together, for example, one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example, a lookup table, a set of records in a database, etc. The instructions and sets of data or values are executable by the controller 410. Execution of the instructions and sets of data or values causes the controller 410 to perform specific acts to cause the electric vehicle sharing management system 302, or other applicable item shown in FIG. 2, to perform the functions described herein. Execution of the instructions and sets of data or values may also cause the controller 410 to perform specific acts to cause the electric vehicle sharing management system 302 to receive, send, store, maintain, update and otherwise manage electric vehicle sharing information. Specific operation of the electric vehicle sharing management system 302 and other applicable items within the electric vehicle sharing system is described herein and with reference to applicable figures.

The controller 410 may use RAM 414 in a conventional fashion, for volatile storage of instructions, data, etc. The controller 410 may use data store 416 to log or retain information, for example, information regarding electric vehicle sharing information described herein.

The control subsystem 402 may also receive signals from various sensors and/or components of a collection, charging and distribution machine, such as the collection, charging and distribution machine 108a of FIG. 1 via a communications subsystem of collection, charging and distribution machine 108a or additionally via the network 104 as applicable. This information may include information that characterizes or is indicative of operation, status, or condition of such components. This information may be communicated to the control subsystem 402.

The communications subsystem 406 may include one or more communications modules or components which facilitates communications with the other items shown in FIGS. 1 through 3; the various components of a collection, charging and distribution machine, such as collection, charging and distribution machine 108a, mobile device 204, key fob 20 and/or one or more electric vehicles, such as electric vehicle 110. Such communications modules or components of the communications subsystem 406 facilitate this communication in a manner such that data may be exchanged between items of FIGS. 1 through 3. The communications subsystem 406 may, for example, include one or more modems 452, or one or more Ethernet or other types of communications cards or components 454. A port 456a of the control subsystem 402 may communicatively couple the control subsystem 402 with a port 456b of the communications subsystem 406. The communications subsystem 406 may provide wired and/or wireless communications. The communications subsystem 406 may include one or more ports, wireless receivers, wireless transmitters or wireless transceivers to provide wireless signal paths to the various remote components or systems employing or making use of any applicable operable wired and wireless communications standard or protocol. The remote communications subsystem 406 may include one or more bridges or routers suitable to handle network traffic including switched packet type communications protocols (TCP/IP), Ethernet or other networking protocols.

The user interface system 408 includes one or more user input/output (I/O) components (not illustrated). For example, user interface system 408 may include a touch screen display operable to present information and a graphical user interface (GUI) to a user and to receive indications of user selections. The user interface system 408 may include a keyboard or keypad, and/or a cursor controller (e.g., mouse, trackball, trackpad, and/or touch screen) to allow a user to enter information and/or select user selectable icons in a GUI. The user interface system 408 may include microphones and/or speakers to accept voice input and/or output audio to present information to the user.

Figure 5A:
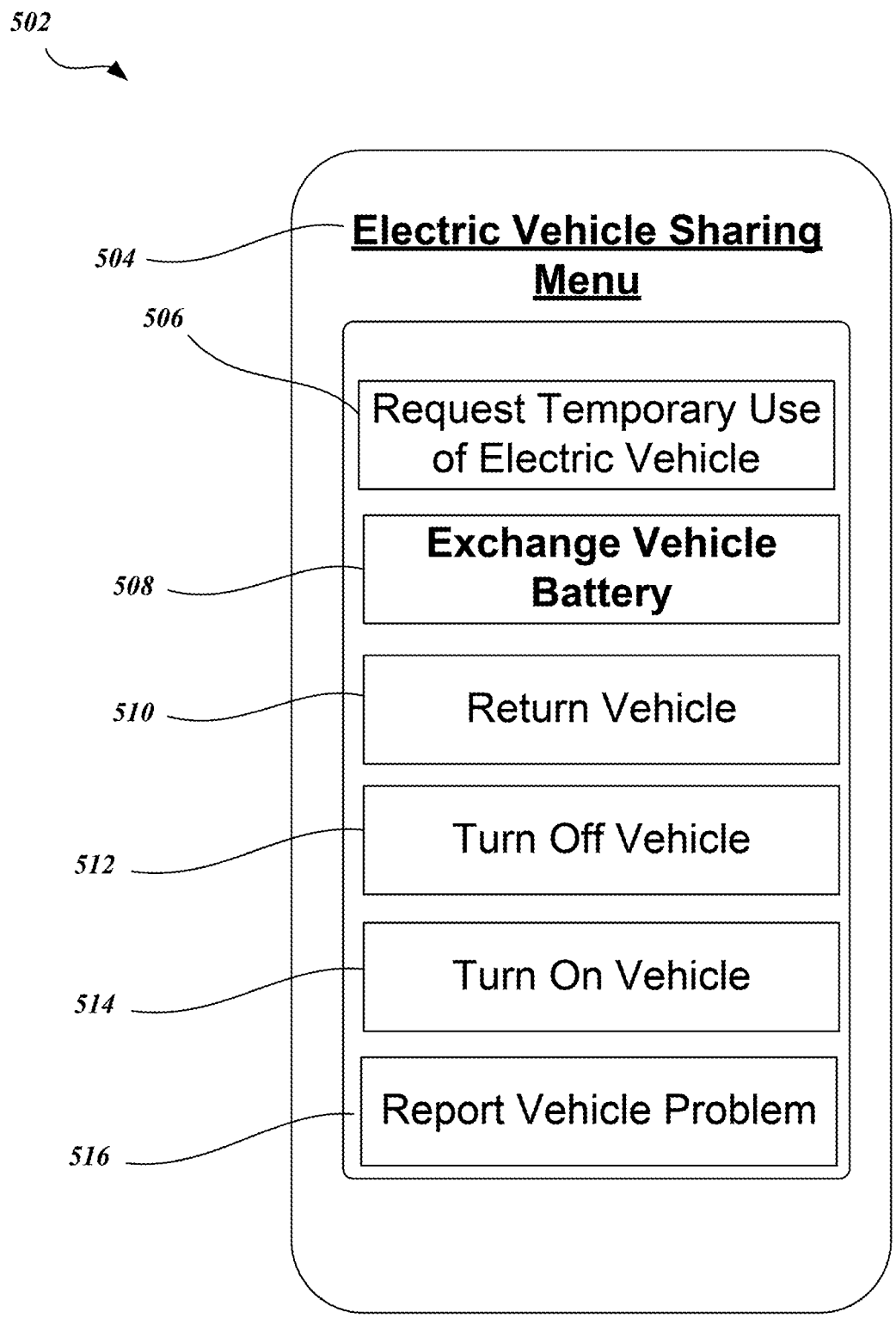
FIG. 5A is an example user interface screen of a system for electric vehicle sharing, according to one non-limiting illustrated embodiment.

FIG. 5A is an example user interface screen 502 of a system for electric vehicle sharing, according to one non-limiting illustrated embodiment. In some embodiments, user interface screen 502, for example, may be a user interface screen of an application running on the mobile device 204. In other embodiments, user interface screen 502 may be a user interface screen of a collection, charging and distribution machine, such as collection, charging and distribution machine 108a or 108b or of an electric vehicle, such as electric vehicle 110. User interface screen 502 is an example of an initial graphical user interface (GUI) screen displayed either on the mobile device or at a collection, charging and distribution machine. Shown is an Electric Vehicle Sharing Menu header 504, a "Request Temporary Use of Electric Vehicle" button 506, an "Exchange Vehicle Battery" button 508, a "Return Vehicle" button 510, a "Turn Off Vehicle" button 512, a "Turn On Vehicle" button 514 and a "Report Vehicle Problem" button 516 which the user can press to initiate the process to perform the associated function or operation as described herein. In the present example, the user is in the middle of a temporary use session of an electric vehicle and has selected the "Exchange Vehicle Battery" button 508 to initiate the vehicle battery exchange process at a collection, charging and distribution machine, such as collection, charging and distribution machine 108a, for example.

Figure 5B:
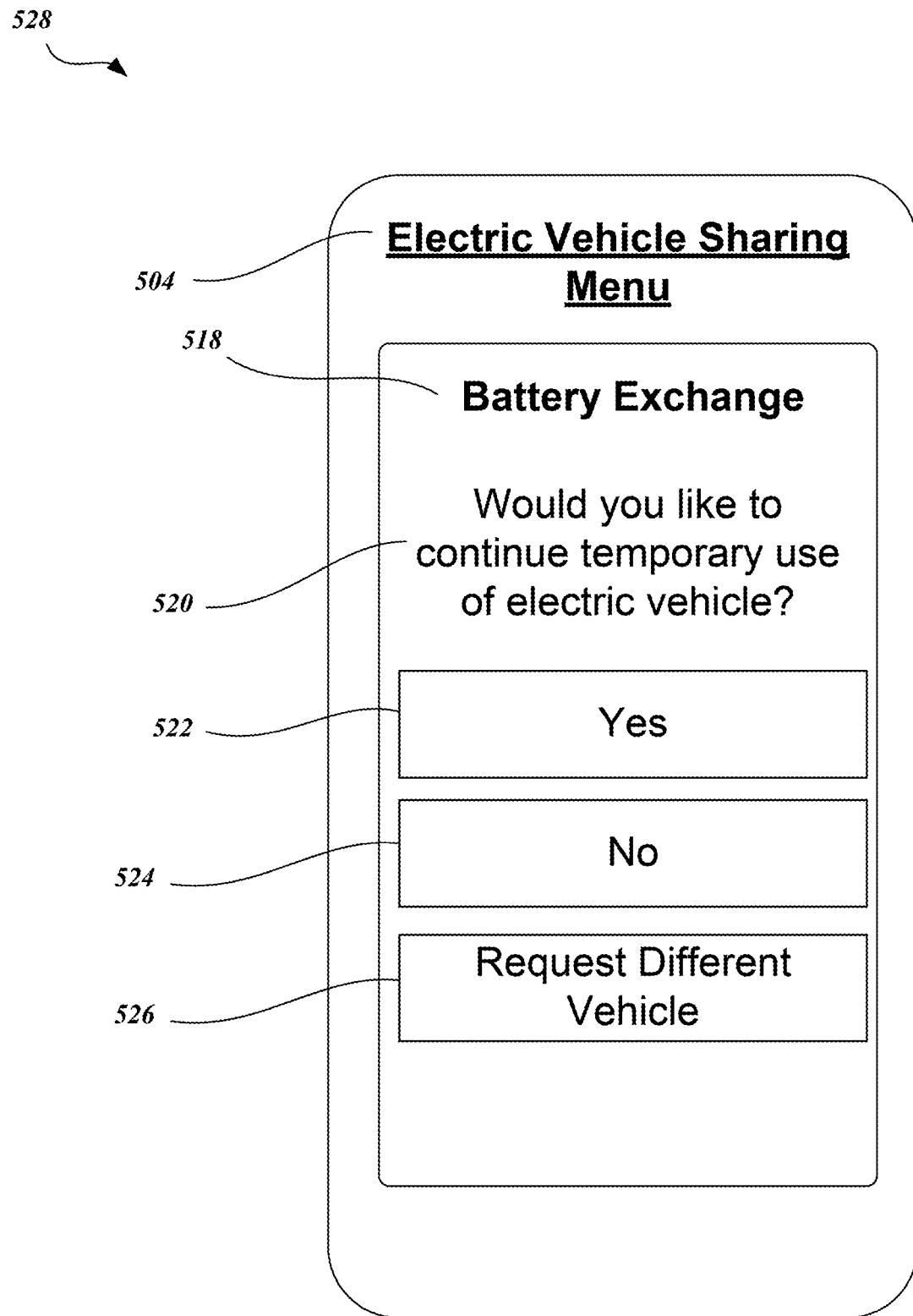
FIG. 5B is an example of another user interface screen of a system for electric vehicle sharing, according to one non-limiting illustrated embodiment.

FIG. 5B is an example of another user interface screen 528 that results when the user has selected the Exchange Vehicle Battery" button 508 shown in the user interface screen 502 of FIG. 5A. Shown is the "Battery Exchange" menu header 518 over a "Would you like to continue temporary use of electric vehicle?" prompt 520 to the user. Also, shown are a "Yes" button 522, a "No" button 524 and a "Request Different Vehicle" button 526, one of which the user may select to respond to the prompt 520 to initiate performance of the action associated with the respective button. For example, if the user selected the "No" button, the request to terminate the temporary use session would be sent as described herein to initiate the process to terminate the temporary use session. Also, if the user desires to switch to a different available electric vehicle, to instead temporarily use the different electric vehicle, the user may initiate the process to do so by selecting the "Request Different Vehicle" button 526.

In an example embodiment, the performance of an electric vehicle 110 selected for temporary use may be automatically set based on a status, rating, classification, level and/or existence of the user's vehicle driver's license or certification. This way, a single vehicle could serve a range of subscribers without running afoul of local laws. It would also allow a user to use their subscription to use the electric vehicle sharing system 202 in multiple states, jurisdictions and countries and the electric vehicle sharing system 202 could ensure the users don't run afoul of local regulations. For example, in France it takes several weeks of school to get a license for motorcycles that have an engine greater than 50 cubic centimeters (cc). So, as a result, most people in France only get a 50 cc certification. The electric vehicle sharing system 202 collects or has access to such data regarding the user's applicable vehicle driver's license or certification classification, or lack thereof. This can be done prior to or during the process initiated by the user to request a temporary use session for a vehicle in the electric vehicle sharing system 202. In some embodiments, this can be done prior to, during or in the process of a user obtaining a subscription to use the electric vehicle sharing system 202.

For example, this data may be input by the user into the collection, charging and distribution machine 108a, into the user's mobile device 204, into a portal device 304 and/or other computing device. The fact that a user lacks a certain driver's license or certification may also be recorded by the electric vehicle sharing system 202. This may be the result of the user indicating to the electric vehicle sharing system 202 that the user does not have a certain driver's license or certification or that such information regarding a certain driver's license or certification has not been provided or is not otherwise available. Such data regarding the user's applicable vehicle driver's license or certification classification, or lack thereof, may also or instead be obtained by the electric vehicle sharing system 202, for example, via network 104, from other sources including, but not limited to, data systems of, or controlled by: governmental institutions; vehicle driver's license or certification issuing authorities; data aggregators of vehicle driver's license or certification data; and various third parties. This data may be communicated to, stored and/or managed by the electric vehicle sharing management system server 106 and then communicated to other collection, charging and distribution machines, portal devices and/or a mobile device 204 of the user.

In one example embodiment, when a user initiates a temporary use session at a collection, charging and distribution machine 108a, a mobile device 204, a portal device 304 and/or other computing device, the electric vehicle sharing system 202 retrieves data regarding a status, rating, classification, level and/or existence of the user's vehicle driver's license or certification and will release a vehicle 110 to the user for temporary use during the temporary use session with a motor that is limited based on the status, rating, classification, level and/or existence of the user's vehicle driver's license or certification. For example, if the user is licensed or certified for a vehicle with 50 cc motor, the electric vehicle sharing system 202 selects a vehicle that has a motor that is equal to or less than that equivalent to that of a 50 cc engine, or limits the power of the motor of the vehicle 110 selected to be equivalent to that of a 50 cc engine. As another example, in Seattle, if the top speed of the vehicle is less than 30 miles per hour (MPH), then no motorcycle license is needed. If the top speed of the vehicle is greater than 30 MPH, then a license is needed. In this scenario, if no license data is provided or available regarding the user, or there is data indicating the user does not have a license, the electric vehicle sharing system 202 may automatically select a vehicle 110 that has a motor that has a top speed less than 30 MPH or limits the power of the motor of the selected vehicle 110 such that the vehicle 110 has a top speed less than 30 MPH.

In some embodiments, the electric vehicle sharing system 202 may provide a selection to the user of vehicles having different performance levels and then checks data indicative of a status, rating, classification, level and/or existence of a driver's license or certification classification of the user to ensure the user is qualified to drive such a vehicle selected according to the user's driver's license or certification classification data, if any. In some example embodiments, if such data does not exist or is not current, then the electric vehicle sharing system 202 may prompt the user to input the data. In other embodiments, the electric vehicle sharing system 202 may limit the selections provided to the user of vehicles having different performance levels to those vehicles that the user is qualified to drive according to the user's driver's license or certification classification data, if any.

In some embodiments, an update of the status of the user's driver's license or certification may be required based on an initial input of an expiration date, on expiration of a set period of time, or on some other criteria regarding when an update of data may be needed. The initial input of the expiration date may be at the time of the user signs up for or otherwise initiates or requests a subscription for use of the electric vehicle sharing system 202, during a subscription, when a temporary use session is initiated or requested, or at some other time. If such an update is not completed, then the performance of the selected electric vehicle 110 released to the user for a temporary use session may be automatically set at a lower level by the electric vehicle sharing system 202. Updating of the driver's license or certification status, rating, classification, or level may be valuable, especially in jurisdictions where, for example, the driver's license that allows the user to drive a vehicle having up to a 150 cc engine expires after a period of time and for users that sign up for subscription that allows them to use the electric vehicle sharing system 202 over a period of time.

For example, if a user initiates a two-year subscription to use the electric vehicle sharing system 202 and upon initiating the subscription provides data indicating the user has a driver's license allowing the user to drive a vehicle having up to a 150 cc engine expiring in one year, then when the user attempts to initiate a temporary use session under the subscription after the expiration date of the license, the user may be prompted by the electric vehicle sharing system 202 to provide update license data to the electric vehicle sharing system 202. If the user does not provide such updated license data, then the performance of the selected electric vehicle released to the user for the temporary use session may be set at a lower level by the electric vehicle sharing system 202, for example 50 cc, until such updated license data is provided. The selected performance level, for example, may be that which a user who does not have a license is legally allowed to drive. In other embodiments, the electric vehicle sharing system 202 may not grant a request for a temporary use session until such updated license data is provided. Also, in some example embodiments, a user may be required to provide updated driver's license or certification data in order to renew or continue their subscription to use the electric vehicle sharing system 202.

The electric vehicle sharing system 202 may limit or set the power of the motor of the vehicle 110 by limiting motor current (which would limit torque). For example, a motor might be designed for 100 A of continuous current, and that current would deliver a torque that would accelerate a scooter to a certain speed in a certain amount of time that would be comparable to a vehicle having a 150 cc engine. More specifically, if the motor current of vehicle 110 were limited to 50 A, this may result in a performance of the vehicle 110 that is comparable to a vehicle having a 75 cc engine. As another example, if the motor current of vehicle 110 were limited to 33 A, this may result in a performance of the vehicle 110 that is comparable to a vehicle having a 50 cc engine.

The motor current could be limited by the collection, charging and distribution machine 108a sending a signal to a motor controller of the vehicle 110 located at the collection, charging and distribution machine 108a or to a portable electrical power storage device controller in the portable electrical power storage device to limit the current provided by, or drawn from, the portable electrical power storage device powering the motor of the vehicle 110. In some embodiments, such a signal may be communicated by the electric vehicle sharing management system server 106 to the collection, charging and distribution machine 108a based on the data stored or accessible by the electric vehicle sharing management system server 106 indicative of a status, rating, classification, level and/or existence of a driver's license or certification of the user. In some embodiments, such a signal may be communicated to a portable electrical power storage device in the collection, charging and distribution machine 108a that is to power the vehicle 110, or to a mobile device 204 of the user to send to the collection, charging and distribution machine 108a. When the portable electrical power storage device is then placed in the vehicle upon starting the temporary use session, the portable electrical power storage device will communicate a command to the vehicle to limit the current drawn from the portable electrical power storage device accordingly. In some embodiments, the collection, charging and distribution machine 108a may send such a signal directly to the vehicle 110 or to the portable electrical power storage device in the vehicle 110 to limit the current drawn from or provided by the portable electrical power storage device accordingly.

In some embodiments, the portable electrical power storage device will limit the power it provides to the motor of the vehicle 110 in response to a signal received that was sent according to a status, rating, classification, level and/or existence of a driver's license or certification of the user. Such a signal to limit the motor current may be communicated from the electric vehicle sharing management system server 106 to a mobile device 204 of the user, which will then be communicated to the vehicle 110, to the portable electrical power storage device currently in the vehicle 110, and/or to a portable electrical power storage device selected by the collection, charging and distribution machine 108a to be placed in the vehicle. The performance of the vehicle 110 may also or instead be limited, or a particular vehicle for temporary use may be selected, according to various desired vehicle or performance characteristics based on a status, rating, classification, level and/or existence of a driver's license or certification of the user, including but not limited to: top speed, throttle response, acceleration, range, vehicle weight, size, on or off-road classification of vehicle, tire size, transmission type, motor type, vehicle battery type, vehicle battery performance characteristics and other vehicle characteristics.

Limiting or setting of the performance of the electric vehicle 110, limiting or setting performance of the portable electrical power storage device powering the electric vehicle 110, and/or selecting a particular portable electrical power storage device to limit or set the performance of the electric vehicle 110 may be performed as described in one or more of: U.S. Patent Application Publication No. 2013/0026973; U.S. Patent Application Publication No. 2013/0026972; and U.S. Patent Application Publication No. 2013/0030630, which are each incorporated herein by reference in their entireties.

Figure 6:
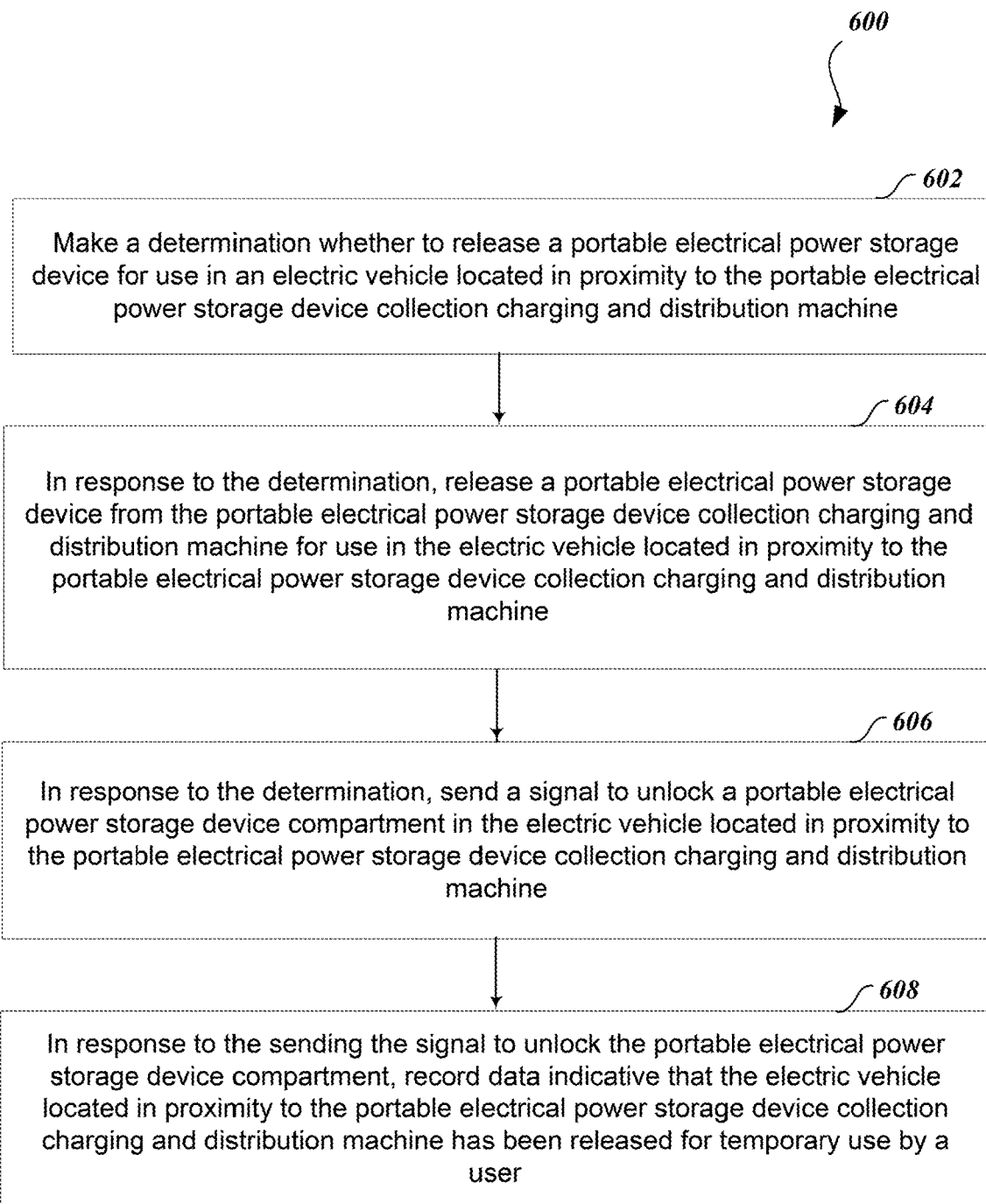
FIG. 6 is a flow diagram showing a method in a system of electric vehicle sharing, according to a first non-limiting illustrated embodiment.

FIG. 6 is a flow diagram showing a method 600 in a system of electric vehicle sharing, according to a first non-limiting illustrated embodiment.

At 602, the system makes a determination whether to release a portable electrical power storage device for use in an electric vehicle located in proximity to the portable electrical power storage device collection, charging and distribution machine.

At 604, the system, in response to the determination, releases a portable electrical power storage device from the portable electrical power storage device collection, charging and distribution machine for use in the electric vehicle located in proximity to the portable electrical power storage device collection, charging and distribution machine.

At 606, the system, in response to the determination, sends a signal to unlock a portable electrical power storage device compartment in the electric vehicle located in proximity to the portable electrical power storage device collection, charging and distribution machine.

At 608, the system, in response to the sending the signal to unlock the portable electrical power storage device compartment, records data indicative that the electric vehicle located in proximity to the portable electrical power storage device collection, charging and distribution machine has been released for temporary use by a user.

Figure 7:
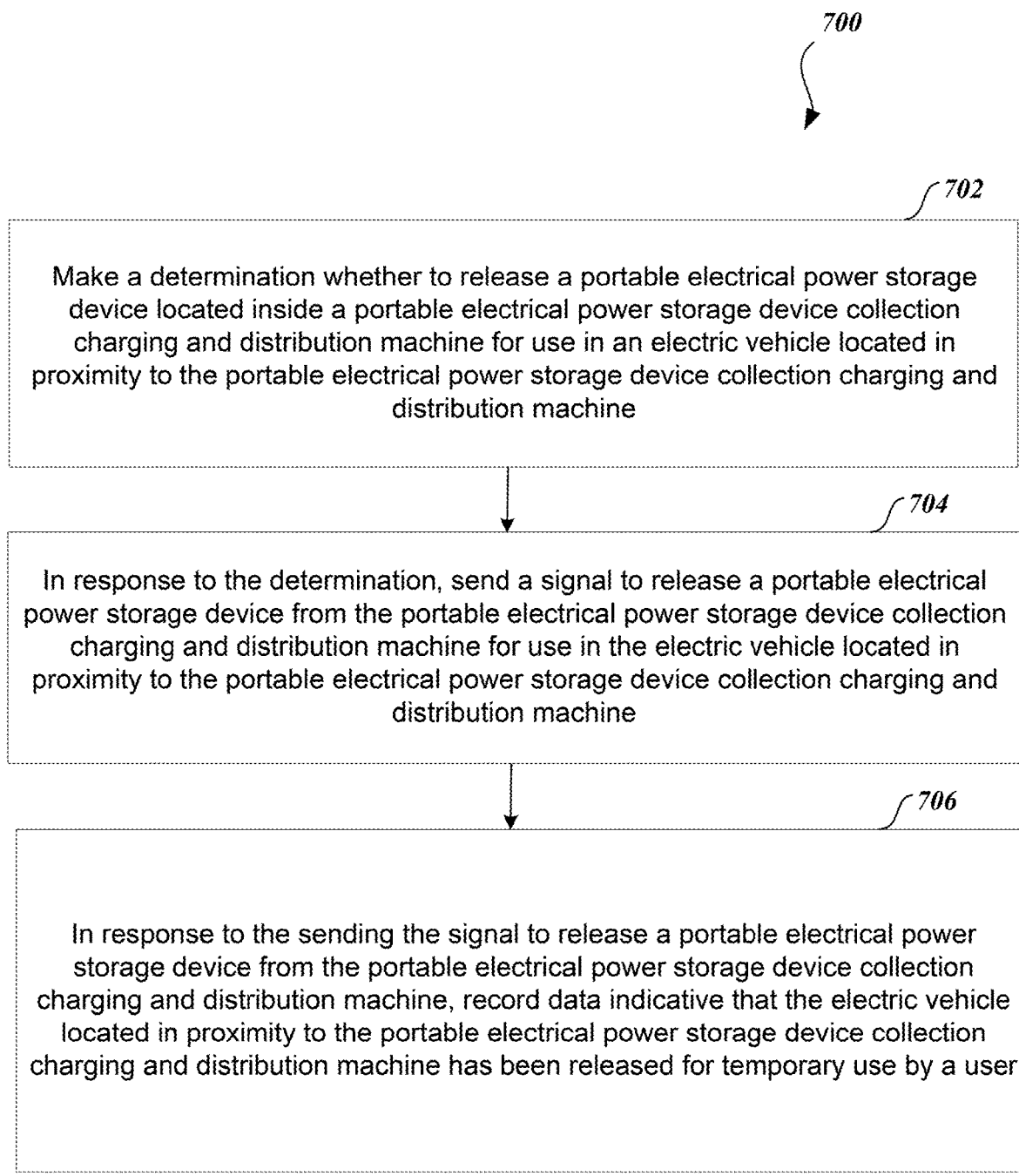
FIG. 7 is a flow diagram showing a method in a system of electric vehicle sharing, according to a second non-limiting illustrated embodiment.

In some example embodiments, the user contracts with a service provider for rental service of electric scooters, and the user is given a key fob. In this example embodiment, the key fob does not link to any particular scooter, but is instead used to initiate rental sessions with the collection, charging and distribution machine. Upon initiating a rental session, the collection, charging and distribution machine will initiate a disposable, time-limited authorization associated with the key fob. The authorization ties the key fob to a particular scooter. The time limit is for a period much longer than the expected duration. That is, if the user wants to rent for three hours, then the ultimate time limit will be set to 24 hours, for example. That key fob will then let the user operate the scooter as if it were the user's own scooter. Upon completion of the rental, the user will again swap the battery of the scooter at, or place it in, the collection, charging and distribution machine and select the option to terminate the session. The collection, charging and distribution machine will verify the presence of the nearby scooter and confirm it is locked. The key fob will no longer operate the scooter after terminating the session. If the user doesn't come back after the initial agreed upon rental period (for example, 3 hours), then some grace period will elapse and finally the ultimate time limit will expire and render the key fob inoperative. In this scenario, in some embodiments, instead of a time-limited authorization on the key fob or via a user's mobile device, the authorization is ongoing until the scooter is returned. The user's credit card or prepaid account is automatically charged every hour, every day, every x miles, x motor hours, etc., until the scooter is returned or until an overall maximum time is reached at which point the entire replacement cost of the scooter and battery will be charged to the user's credit card or pre-paid deposit. The above scenario is not limited to electric scooters, but may be applied to other electric vehicles as well. FIG. 7 is a flow diagram 700 showing a method in a system of electric vehicle sharing, according to a second non-limiting illustrated embodiment.

At 702, the system makes a determination whether to release a portable electrical power storage device located inside a portable electrical power storage device collection, charging and distribution machine for use in an electric vehicle located in proximity to the portable electrical power storage device collection, charging and distribution machine.

At 704, the system, in response to the determination, sends a signal to release a portable electrical power storage device from the portable electrical power storage device collection, charging and distribution machine for use in the electric vehicle located in proximity to the portable electrical power storage device collection, charging and distribution machine.

At 706, the system, in response to the sending of the signal to release a portable electrical power storage device from the portable electrical power storage device collection, charging and distribution machine, records data indicative that the electric vehicle located in proximity to the portable electrical power storage device collection, charging and distribution machine has been released for temporary use by a user.

Figure 8:
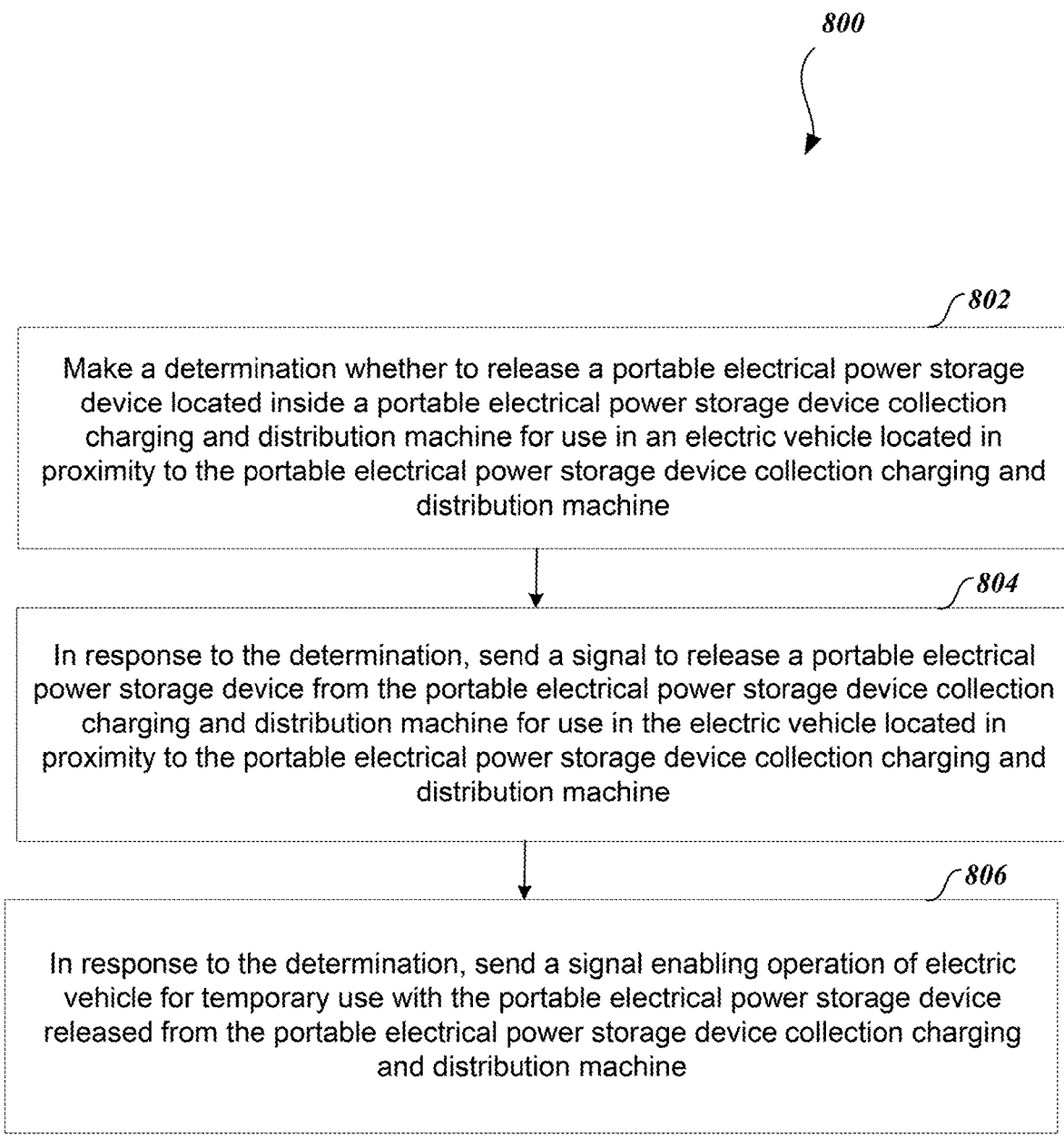
FIG. 8 is a flow diagram showing a method in a system of electric vehicle sharing, according to a third non-limiting illustrated embodiment.

FIG. 8 is a flow diagram showing a method 800 in a system of electric vehicle sharing, according to a third non-limiting illustrated embodiment.

At 802, the system makes a determination whether to release a portable electrical power storage device located inside a portable electrical power storage device collection, charging and distribution machine for use in an electric vehicle located in proximity to the portable electrical power storage device collection, charging and distribution machine.

At 804, the system, in response to the determination, sends a signal to release a portable electrical power storage device from the portable electrical power storage device collection, charging and distribution machine for use in the electric vehicle located in proximity to the portable electrical power storage device collection, charging and distribution machine.

At 806, the system, in response to the determination, sends a signal enabling operation of an electric vehicle for temporary use with the portable electrical power storage device released from the portable electrical power storage device collection, charging and distribution machine.

One or more of the determination whether to release a portable electrical power storage device, the sending of the signal to release a portable electrical power storage device and the sending of the signal enabling operation of an electric vehicle for temporary use at least one computer processor may be performed by at least one computer processor of a mobile device in communication with a portable electrical power storage device collection, charging and distribution machine or the electric vehicle sharing management system server 106.

One or more of the determination whether to release a portable electrical power storage device, the sending of the signal to release a portable electrical power storage device and the sending of the signal enabling operation of an electric vehicle for temporary use at least one computer processor may be performed by at least one computer processor of a portable electrical power storage device collection, charging and distribution machine, a mobile device in communication with a portable electrical power storage device collection, charging and distribution machine and/or the electric vehicle sharing management system server 106.

Figure 9:
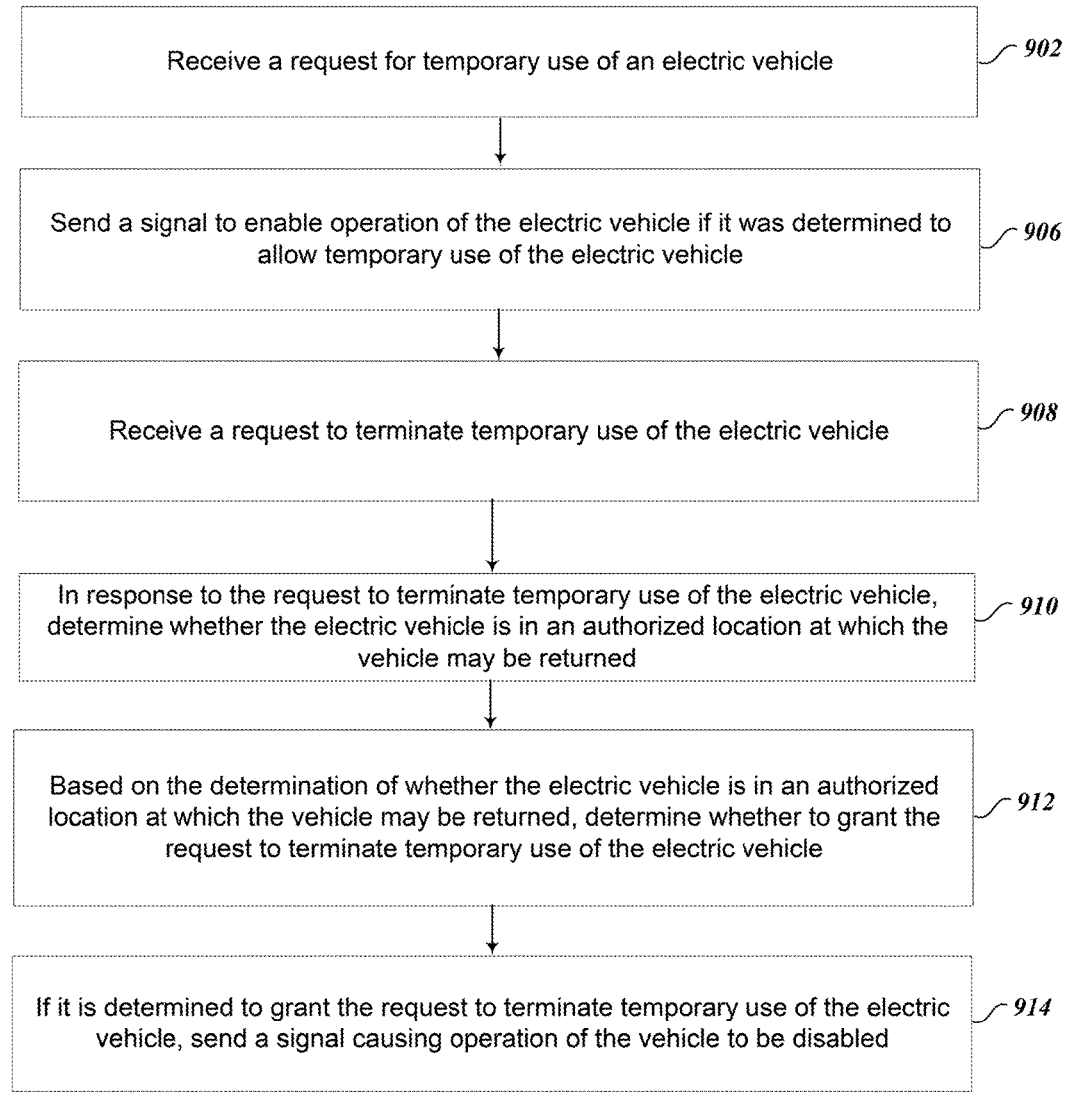
FIG. 9 is a flow diagram showing a method in a system of electric vehicle sharing, according to a fourth non-limiting illustrated embodiment.

FIG. 9 is a flow diagram showing a method 900 in a system of electric vehicle sharing, according to a fifth non-limiting illustrated embodiment.

At 902, the system receives a request for temporary use of an electric vehicle.

At 904, the system determines whether to allow temporary use of the electric vehicle based on the request.

At 906, the system sends a signal to enable operation of the electric vehicle if it was determined to allow temporary use of the electric vehicle.

At 908, the system receives a request to terminate temporary use of the electric vehicle.

At 910, the system, in response to the request to terminate temporary use of the electric vehicle, determines whether the electric vehicle is in an authorized location at which the vehicle may be returned.

At 912, the system, based on the determination of whether the electric vehicle is in an authorized location at which the vehicle may be returned, determines whether to grant the request to terminate temporary use of the electric vehicle.

At 914, the system, if it is determined to grant the request to terminate temporary use of the electric vehicle, sends a signal causing operation of the vehicle to be disabled.

Figure 10:
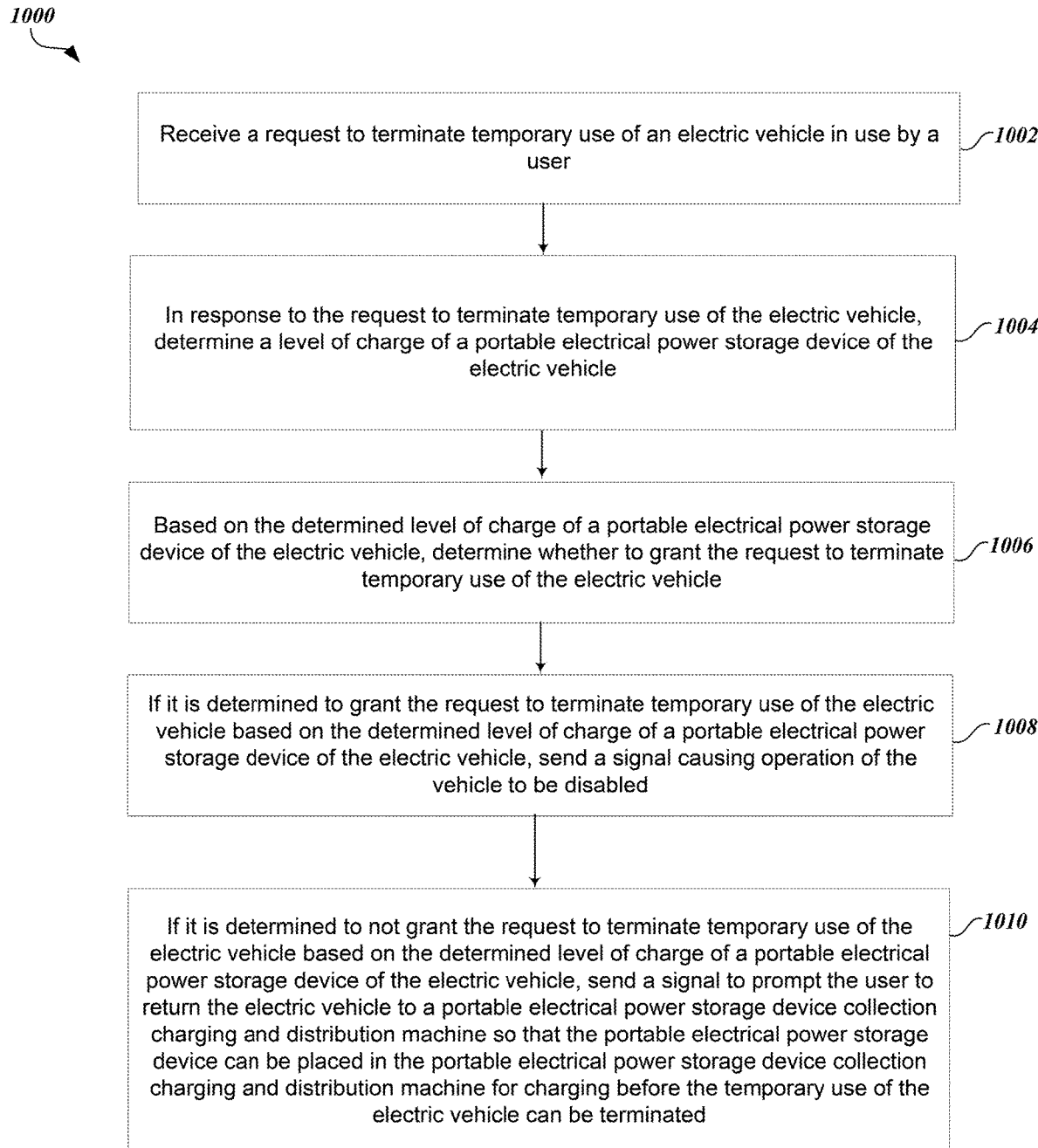
FIG. 10 is a flow diagram showing a method in a system of electric vehicle sharing, according to a fifth non-limiting illustrated embodiment.

FIG. 10 is a flow diagram showing a method 1000 in a system of electric vehicle sharing, according to a fifth non-limiting illustrated embodiment.

At 1002, the system receives a request to terminate temporary use of an electric vehicle by a user.

At 1004, the system, in response to the request to terminate temporary use of the electric vehicle, determines a level of charge of a portable electrical power storage device of the electric vehicle.

The process described above with reference to FIG. 9 is one of the example processes described herein that allows the user to end the temporary use session and return the electric vehicle remotely (i.e., not at a location of a collection, charging and distribution machine, vending machine, kiosk, portal device or other device installed at a particular location to verify the vehicle has been returned at that location). This may be referred to as a "remote check-in." If the electric vehicle is somehow moved without authorization after such a remote check-in, then the electric vehicle can be manually retrieved by a service provider or be allowed to be rented if still within an authorized area. If the user leaves the electric vehicle in an illegal or unauthorized area, or otherwise does not return the electric vehicle after an overall maximum time limit has been reached, then the user's credit or debit card or prepaid account may be charged for the entire replacement cost of the electric vehicle. The user could also purchase insurance to avoid this. If the user is unable to do remote check-in with the user's mobile device or via a communication system built into the electric vehicle (e.g., phone dies or no signal) or if the system detects that the charge level of the portable electrical power storage device of the electric vehicle is too low, then such remote check-in may be dynamically disabled by the system (or just not work) and the user may then be notified by the system that the user must drive to the closest collection, charging and distribution machine immediately and place the portable electrical power storage device of the electric vehicle in the collection, charging and distribution machine (if charge level is too low) or potentially be charged a service call if the portable electrical power storage device of the electric vehicle runs out of charge such that the vehicle cannot be driven.

Another issue is possible mechanical failure of, or an accident involving, the electric vehicle during rental or other temporary use such that the electric vehicle becomes inoperable or otherwise not drivable. Notifications of such can be sent by the user to the electric vehicle sharing management system server 106 via the mobile device 204 of the user or detections of such mechanical failures or accidents and/or notifications of such can be performed by an automatic diagnosis/detection system as described in U.S. patent application Ser. No. 14/536,042, which is incorporated herein by reference in its entirety. For example, detected events such as impacts, accidents, breakdowns, and types of driving behaviors based on feedback from tilt, gravity, accelerometers, pressure sensors and/or shock sensors within the portable electrical power storage device in the electric vehicle and/or otherwise within the electric vehicle are communicated to the user's mobile device, dashboard display and/or backend systems (e.g., the electric vehicle sharing management system server 106) over wired and/or wireless communication channels. An alert originating from the electric vehicle sharing management system server 106 or other service provider system may then be sent to the user's mobile device 204 or to the electric vehicle 110 for the user to stay with the electric vehicle in a safe location off the road and can initiate a pickup or service call to the electric vehicle's current location (and/or deliver another electric vehicle or charged battery) at which point it can be determined if the electric vehicle failure is because of damage and/or negligence caused by the user. If the user simply ran out of battery, this service call may be charged to user. In some example embodiments, a request for a replacement scooter may be automatically sent in response to the accident or damage detection. For example, in some embodiments, the user may decide to purchase insurance or a roadside assistance plan to avoid being charged for damage and/or to obtain assistance in such a situation.

Furthermore, one or more additional products or services associated with the temporary use of the electric vehicle may be obtained by the user in conjunction with the request for temporary use of the vehicle or sometime before or after such request for temporary use of the vehicle. These additional products or services associated with the temporary use of the electric vehicle may include, but are not limited to, one or more of: insurance coverage regarding the temporary use of the vehicle; roadside assistance regarding temporary use of the vehicle, electric vehicle replacement service, credits associated with temporary use of the vehicle, frequent user points associated with temporary use of the vehicle, association of one or more social media accounts with temporary use of the vehicle, electric vehicle add-ons, choice of electric vehicle options, choice of electric vehicle upgrades, choice of portable electrical power storage device options, choice of portable electrical power storage device performance options, choice of electric vehicle range, choice of navigation system options, provision of mobile device connectivity to electric vehicle, upgraded electric vehicle performance options, extended temporary use time of the electric vehicle, tying of user payment account to temporary use of the electric vehicle for automatic charging of the account for temporary use of the electric vehicle, option to reserve the same electric vehicle for future temporary use, option to reserve a particular electric vehicle for future temporary use by the user, option to keep an electric vehicle reserved at one or more particular locations for future temporary use by the user, priority status of the user for reserving electric vehicles for temporary use, upgraded status of an account of the user associated with temporary use of the electric vehicle, free trial of subscription account associated with temporary use of electric vehicles, delivery of the electric vehicle to a particular location, ability of the user to drop off electric vehicle after use at specific locations, ability of the user to drop off electric vehicle after use at an expanded group of locations, option for user to purchase the electric vehicle.

At 1006, the system, based on the determined level of charge of a portable electrical power storage device of the electric vehicle, determines whether to grant the request to terminate temporary use of the electric vehicle.

At 1008, the system, if it is determined to grant the request to terminate temporary use of the electric vehicle based on the determined level of charge of a portable electrical power storage device of the electric vehicle, sends a signal causing operation of the vehicle to be disabled.

At 1010, the system, if it is determined to not grant the request to terminate temporary use of the electric vehicle based on the determined level of charge of a portable electrical power storage device of the electric vehicle, sends a signal to prompt the user to return the electric vehicle to a portable electrical power storage device collection, charging and distribution machine so that the portable electrical power storage device can be placed in the portable electrical power storage device collection, charging and distribution machine for charging before the temporary use of the electric vehicle can be terminated.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A system, comprising:
at least one computer processor; and
at least one memory coupled to the at least one computer processor, the at least one memory having computer executable instructions stored thereon that, when executed, cause the at least one computer processor to:
receive, by the at least one computer processor, a signal for temporary use of an electric vehicle located in proximity of a portable electrical power storage device collection, charging and distribution machine;
in response to the signal for temporary use of the electric vehicle, make a determination whether to release a portable electrical power storage device located inside the portable electrical power storage device collection, charging and distribution machine for use in the electric vehicle located in proximity to the portable electrical power storage device collection, charging and distribution machine, wherein the determination is made based on a classification of a user to temporary use the electric vehicle, and wherein the classification is indicative of a performance of a motor of the electric vehicle when the motor of the electric vehicle is powered by the portable electrical power storage device;
in response to the determination, send a signal to release a portable electrical power storage device from the portable electrical power storage device collection, charging and distribution machine for use in the electric vehicle located in proximity to the portable electrical power storage device collection, charging and distribution machine;
receiving, by the at least one computer processor, vehicle information via a wireless communication from the electric vehicle; and
in response to the vehicle information, sending a control signal to the electric vehicle to instruct the electric vehicle to perform a vehicle function.

2. The system for electric vehicle sharing of claim 1 wherein the at least one computer processor is a computer processor of a server machine in communication with and located remotely from the portable electrical power storage device collection, charging and distribution machine.

3. The system for electric vehicle sharing of claim 1 wherein the at least one computer processor is a computer processor of a mobile device in communication with the portable electrical power storage device collection, charging and distribution machine or an electric vehicle sharing server computer.

4. The system for electric vehicle sharing of claim 1 wherein the computer executable instructions, when executed, further cause the at least one computer processor to detect that the released charged portable electrical power storage device has been removed from the portable electrical power storage device collection, charging and distribution machine for use in the electric vehicle located in proximity to the portable electrical power storage device collection, charging and distribution machine before the recordation of data indicative that the electric vehicle located in proximity to the portable electrical power storage device collection, charging and distribution machine has been released for temporary use.

5. The system of claim 1 wherein the computer executable instructions, when executed, further cause the at least one computer processor to send a signal via a user mobile device to unlock a portable electrical power storage device compartment of the electric vehicle.

6. The system of claim 1 wherein the at least one processor includes at least one processor of a remote server that the computer executable instructions cause to make the determination and at least one processor of a collection, charging and distribution machine that the computer executable instructions cause to send the signal to release the portable electrical power storage device.

7. The system for electric vehicle sharing of claim 1 wherein the vehicle function includes turning off or turning on a light of the electric vehicle.

8. The system for electric vehicle sharing of claim 1 wherein the vehicle function includes activating a horn of the electric vehicle.

9. The system of claim 1, wherein the classification indicates a current drawn from the portable electrical power storage device to power the motor of the electric vehicle or a torque that accelerates the electric vehicle to a speed within a period of time.

\* \* \* \* \*